US012746577B1

(12) United States Patent
Filler et al.

(10) Patent No.: US 12,746,577 B1
(45) Date of Patent: Sep. 29, 2026

(54) METHODS AND ARRANGEMENTS FOR IDENTIFYING AND SORTING ITEMS

(71) Applicant: DMRC LLC, Beaverton, OR (US)

(72) Inventors: Tomas Filler, Beaverton, OR (US); Vojtech Holub, Lafayette, CO (US)

(73) Assignee: DMRC LLC, Beaverton, OR (US)

( * ) Notice: Subject to any disclaimer, the term of this patent is extended or adjusted under 35 U.S.C. 154(b) by 401 days.

(21) Appl. No.: 18/226,018

(22) Filed: Jul. 25, 2023

Related U.S. Application Data

(60) Provisional application No. 63/492,688, filed on Mar. 28, 2023, provisional application No. 63/392,078, filed on Jul. 25, 2022.

(51) Int. Cl.
*B07C 5/34* (2006.01)
*B07C 5/342* (2006.01)
*B65G 47/49* (2006.01)

(52) U.S. Cl.
CPC .......... *B07C 5/3404* (2013.01); *B07C 5/3412* (2013.01); *B07C 5/3422* (2013.01); *B65G 47/493* (2013.01); *B07C 2501/0054* (2013.01)

(58) Field of Classification Search
CPC ... B07C 5/3404; B07C 5/3412; B07C 5/3422; B07C 2501/0054; B65G 47/493
(Continued)

(56) References Cited

U.S. PATENT DOCUMENTS 4,644,151 A 2/1987 Juvinall
5,209,355 A 5/1993 Mindermann
(Continued)

FOREIGN PATENT DOCUMENTS

WO 18193261 10/2018
WO 2018200866 11/2018
(Continued)

OTHER PUBLICATIONS

Becker, et al., Detection of black plastics in the middle infrared spectrum (MIR) using photon up-conversion technique for polymer recycling purposes, Polymers, Sep. 2017;9(9):435.
(Continued)

*Primary Examiner* — Luna Champagne
(74) *Attorney, Agent, or Firm* — Klarquist Sparkman, LLP

(57) ABSTRACT

Plastic waste items are sorted from a conveyor using a diversion apparatus (e.g., air-jets) controlled to act on item ejection target locations. An item ejection target location is estimated by sensing data from an item transported on the conveyor, and determining item identification information based on the sensed item data. This item identification data is then used to access stored metadata about the identified item. This metadata can comprise item catalog data indicating a set of plural different components comprising the item, target metadata indicating location of a desired item ejection target, and/or template (layout) data indicating shapes, spatial positioning and/or relationships of different component parts or areas of the item. This stored metadata is then used with the sensed item data, and sometimes also with discerned item orientation information, to estimate a spatial location of an ejection target for an item. A great number of other features and arrangements are also detailed.

20 Claims, 25 Drawing Sheets

(58) Field of Classification Search
USPC .......................................................... 700/224
See application file for complete search history.

(56) References Cited

U.S. PATENT DOCUMENTS

| | | | | |
|---|---|---|---|---|
| 5,485,964 | A | 1/1996 | Booth | |
| 5,615,778 | A | 4/1997 | Kaiser | |
| 5,965,858 | A | 10/1999 | Suzuki | |
| 6,390,368 | B1 | 5/2002 | Edwards | |
| 6,590,996 | B1 | 7/2003 | Reed | |
| 6,711,293 | B1 | 3/2004 | Lowe | |
| 9,959,587 | B2 | 5/2018 | Sharma | |
| 10,242,434 | B1 | 3/2019 | Holub | |
| 10,664,722 | B1 | 5/2020 | Sharma | |
| 10,710,119 | B2 | 7/2020 | Kumar | |
| 11,769,241 | B1 | 9/2023 | Rhoads | |
| 12,348,693 | B1 | 7/2025 | Brundage | |
| 12,348,840 | B2 | 7/2025 | Sharma | |
| 2004/0044436 | A1 | 3/2004 | Arleth | |
| 2006/0070928 | A1 | 4/2006 | Lovhaugen | |
| 2007/0158245 | A1 | 7/2007 | Kenny | |
| 2008/0257793 | A1 | 10/2008 | Valerio | |
| 2009/0152173 | A1 | 6/2009 | Miller | |
| 2010/0282646 | A1 | 11/2010 | Looy | |
| 2012/0031818 | A1 | 2/2012 | Frost | |
| 2012/0168354 | A1 | 7/2012 | Sundholm | |
| 2014/0305851 | A1 | 10/2014 | Hubbell | |
| 2014/0365381 | A1 | 12/2014 | Borowski | |
| 2017/0225199 | A1 | 8/2017 | Koistinen | |
| 2018/0056336 | A1 | 3/2018 | Castelli | |
| 2018/0065155 | A1 | 3/2018 | Ripley | |
| 2018/0349864 | A1 | 12/2018 | Tsutsumi | |
| 2019/0030571 | A1 | 1/2019 | Horowitz | |
| 2019/0306385 | A1 | 10/2019 | Sharma | |
| 2020/0338753 | A1 | 10/2020 | Schultz | |
| 2021/0206586 | A1 | 7/2021 | Douglas | |
| 2021/0237262 | A1 | 8/2021 | Holopainen | |
| 2021/0299706 | A1 | 9/2021 | Filler | |
| 2022/0055071 | A1 | 2/2022 | Sharma | |
| 2022/0106129 | A1 | 4/2022 | Douglas | |
| 2022/0141373 | A1* | 5/2022 | Brunk | B07C 5/342 348/143 |
| 2022/0161298 | A1* | 5/2022 | Kumar | B07C 5/342 |
| 2022/0331841 | A1 | 10/2022 | Filler | |

FOREIGN PATENT DOCUMENTS

| | | | | |
|---|---|---|---|---|
| WO | WO-2019180438 A2 * | 9/2019 | G06Q 10/0833 |
| WO | 2020186234 | 9/2020 | |
| WO | WO-2020186234 A1 * | 9/2020 | G06V 10/50 |
| WO | 2021070182 | 4/2021 | |
| WO | 2021195563 | 9/2021 | |
| WO | 21260264 | 12/2021 | |

OTHER PUBLICATIONS

Rosten, et al., Fusing points and lines for high performance tracking, 10th IEEE Int'l Conf. on Computer Vision, 2005, pp. 1508-1515.
Rosten, et al., Machine learning for high-speed corner detection, 2007 European Conference on Computer Vision, pp. 430-443.
Rublee, et al., "ORB: an efficient alternative to SIFT or SURF," 2011 IEEE Int'l Conference on Computer Vision (ICCV).
Woidasky, et al., Inorganic fluorescent marker materials for identification of post-consumer plastic packaging, Resources, Conservation and Recycling, Oct. 1, 2020;161:104976.
Zou, Object Detection in 20 Years: A Survey, arXiv:1905.05055v2, May 16, 2019.

* cited by examiner

| WATER-MARK PAYLOAD | ... | ITEM GTIN | SUBSTRATE PLASTIC RESIN | ITEM HEIGHT | LABEL MATERIAL | DISTANCE FROM ITEM BASE TO BOTTOM OF LABEL | LABEL HEIGHT | DESIRED EJECTION TARGET – DISTANCE ABOVE BASE | TEMPLATE DATA INDICATING ITEM SHAPE | ... |
|---|---|---|---|---|---|---|---|---|---|---|
| 240D791F5 07BB | ... | ... | ... | ... | ... | ... | ... | ... | ... | ... |
| 266A08D7B 885D | ... | 490000688 56 | PET | 8.86" | PVC | 1.46" | 2.85" | 3.94" | ... | ... |
| 181A3BF0B 5290 | ... | 000120000 01086 | BISPHENOL-FREE PET | 8" | ... | ... | ... | ... | ... | ... |
| 20CB4682D B415 | ... | ... | ... | ... | ... | ... | ... | ... | ... | ... |
| 29E07406E C5C4 | ... | ... | ... | ... | ... | ... | ... | ... | ... | ... |

FIG. 10

METHODS AND ARRANGEMENTS FOR IDENTIFYING AND SORTING ITEMS

RELATED APPLICATION DATA

This application claims the benefit of U.S. Provisional Patent Application Nos. 63/492,688, filed Mar. 28, 2023, and 63/392,078, filed Jul. 25, 2022, which are each hereby incorporated herein by reference in their entirety.

More generally, this application expands on applicant's earlier work in this field, as detailed in U.S. patent publications 20220055071, 20210299706 and 20220331841, and allowed U.S. patent application Ser. No. 16/944,136, filed Jul. 30, 2020. The artisan implementing the present technology is presumed to be familiar with the technology detailed in those earlier documents. These foregoing documents are incorporated herein by reference in their entirety.

INTRODUCTION

The present technology concerns improvements to waste processing, to identify and sort items for recycling. In accordance with some aspects, the technology concerns reducing impurities in plastic recyclate by more accurately targeting waste items for ejection from a conveyor belt. In accordance with some aspects, the technology also involves recognizing mistakes to which certain other ejection targeting arrangements are prone, and preventing such mistakes.

Waste sorting commonly employs a linear array of air-jets positioned at the end of a waste-transporting conveyor belt, which are selectively operated to deflect identified items (e.g., polyethylene terephthalate, "PET," bottles) away from their normal falling trajectory towards a first destination, and instead to direct them up and into a more distant second destination (e.g., a bin dedicated to collection of only PET bottles). In theory, this arrangement works well, provided that an item's center of gravity can be accurately identified.

In practice, this arrangement disappoints. Sometimes an item's center of gravity does not coincide with its center of area. This can be due to different plastic thicknesses or densities at different parts of an item, such as a heavy measuring cup or pour spout that forms part of a laundry detergent container neck.

More frequently, sortation suffers due to the chaos of the waste sorting line, which renders identification of a single item, and its center of gravity, uncertain. Dirt or debris commonly overlies parts of items, introducing ambiguities about items' extents. Sometimes a single item is mistaken as two separate items. Other times, two separate items are mistaken as a single item.

Such problems are due, in part, to the fallibility of classification rules employed by sortation systems to identify a "single" item, and to determine such item's center of gravity. When these rules err, ejection targeting suffers. Air-jet activation then propels mis-targeted items into unintended directions. Mis-targeted items end up in the wrong collection bins, or on the floor. This reduces the amount of recyclate recovered and, more critically, contaminates sorted plastics with unintended impurities.

One embodiment employing aspects of the present technology addresses such problems by sensing item data, including image data, from an item transported on a conveyor, and determining item identification information using the sensed item data. Stored metadata about the item is then accessed, based on the determined item identification information. From the sensed item data and the stored metadata, a spatial location of an item ejection target is then estimated.

An actuation force can then be applied to the item in accordance with this estimated location of the item ejection target.

Some such embodiments further determine item orientation information using the sensed item data, such as by orientation of a 2D code symbology on the item (e.g., digital watermarking), or by analysis of the sensed image data using a convolutional neural network.

In some such embodiments, the stored metadata about the item comprises stored template data indicating a physical shape of the item, and/or layout data indicating shapes, spatial positioning and/or relationships of different component parts or areas of the item. Such embodiment can then include estimating spatial location of an item ejection target in accordance with the item orientation information, the sensed item data, and the template data.

In such embodiments, the stored metadata may additionally include stored target metadata indicating location of an item ejection target. Such embodiment can then estimate spatial location of an item ejection target in accordance with the item orientation information, the sensed item data, the template data, and the stored target metadata.

In other embodiments, the stored item metadata includes catalog data indicating a set of plural different components comprising the item. Such an embodiment can apply an item segmentation rule to the sensed item data to determine a spatial boundary encompassing the item, and then check that the spatial boundary does not encompass a component other than components included in the cataloged set of plural different components. After such checking, a spatial location of an item ejection target can then be estimated using the spatial boundary (e.g., the target may be the center of the bounded region).

In particular implementations, the sensed item data can comprise first image data sensed in visible light and second image data sensed in infrared light. Both the first and second image data can then be employed in estimating the spatial location of the item ejection target.

Determining the item identification information, and/or estimating the item ejection target spatial location, can employ information discerned from a data carrying symbology, such as a digital watermark or QR code depicted in the sensed image data. Additionally or alternatively, such determining and/or estimating can employ information discerned from convolutional neural network analysis of the sensed image data. Additionally or alternatively, such determining and/or estimating can employ information discerned from a reflection spectrum of the sensed item data-such as by near infrared spectroscopy. In some implementations, determining the item identification information and estimating the item ejection target spatial location makes use of information discerned using two or more of the just-stated technologies.

One particular method includes obtaining image data corresponding to an item on a conveyor belt and, from the image data, determining attribute data for each of plural image zones; discerning an identity of the item from the image data; and obtaining metadata corresponding to the item identity, where the metadata includes template data that comprises first attribute data for a first area of the item and second attribute data for a second area of the item; and establishing an orientation frame of reference for the item from the image data. This method further includes determining one or more possible placements of the plural image zones that is spatially-consistent with said first and second attribute data; and, from the one or more placements, estimating a location of an ejection target for the item.

Another method employing aspects of the present technology includes determining identification information for a waste item on a conveyor belt by processing image data depicting the item; using the identification information to obtain metadata about the item, where the metadata indicates that the item originally comprised a body portion of a first plastic, and a second portion of a second, different plastic; and diverting the item from the conveyor belt to a destination. The method further includes detecting an area of the second plastic on the belt; determining a frame of reference for the item as depicted in the image data; using the determined frame of reference in evaluating whether said detected area of the second plastic comprises part of the item; and establishing an ejection target for diverting in accordance with an outcome of the evaluating.

Still another method employing aspects of the present technology includes obtaining image data including data depicting plural items on a conveyor belt; from the image data, determining attribute data for plural image zones; and determining a segmentation of the image data that identifies a candidate boundary for a single item on the conveyor. This method further including discerning an identity for the single item from image data included within the candidate segmentation; obtaining metadata corresponding to the item identity; checking the candidate segmentation against the metadata; and determining that the candidate segmentation is inconsistent with the metadata.

The disclosure also provides support for a method comprising the acts: sensing item data from a plastic waste item transported on a conveyor, including image data, determining item identification information, using the sensed item data, accessing stored metadata about the item based on the determined item identification information, and estimating spatial location of an item ejection target, using the sensed item data and the stored metadata. In a first example of the method in which the stored metadata about the item comprises (a) template data indicating physical shape of the item, and/or layout data indicating shapes, spatial positioning and/or relationships of different component parts or areas of the item, (b) stored target metadata indicating location of an item ejection target, and/or (c) item catalog data indicating a set of plural different components comprising the item. In a second example of the method, optionally including the first example in which the stored metadata about the item comprises said (a) stored template data, wherein the method includes: determining item orientation information using the sensed item data, and estimating spatial location of an item ejection target in accordance with the item orientation information, the sensed item data, and the template data. In a third example of the method, optionally including one or both of the first and second examples in which the stored metadata about the item comprises said (a) stored template data, and (b) stored target metadata, wherein the method includes: determining item orientation information using the sensed item data, and estimating spatial location of an item ejection target in accordance with the item orientation information, the sensed item data, the template data, and the stored target metadata. In a fourth example of the method, optionally including one or more or each of the first through third examples in which the image data includes infrared imagery, and the method includes determining the item orientation information by orientation of a 2D code symbology on the item, or by neural network analysis of the sensed item data. In a fifth example of the method, optionally including one or more or each of the first through fourth examples in which the method includes: determining the item orientation information by orientation of a 2D code symbology on the item or by neural network analysis of the sensed item data, and detecting a label landmark from the imagery, and estimating spatial location of the item ejection target using the detected label landmark. In a sixth example of the method, optionally including one or more or each of the first through fifth examples in which: the sensing provides first item attribute data at a first location and second item attribute data at a second location, said first and second item attribute data comprising a spatial constellation of attribute information, and the estimating includes determining a positioning of said spatial constellation of attribute information that is consistent with said template data. In a seventh example of the method, optionally including one or more or each of the first through sixth examples in which the stored metadata about the item comprises said (c) catalog data, wherein the method includes: applying an item segmentation rule to the sensed item data to determine a spatial boundary encompassing said item, checking that said spatial boundary does not encompass a component other than components included in said set of plural different components, and estimating spatial location of an item ejection target using said spatial boundary.

The disclosure also provides support for a waste sorting system comprising: a conveyor that transports waste items, one or more sensors that produce sensed item data from waste items on the conveyor, the one or more sensors including one or more cameras that image the waste items, a watermark decoder, a neural network, a barcode reader, or an optical character recognition system coupled to receive data corresponding to imagery captured by the one or more cameras, operative to produce item identification information for an item, a processor configured to obtain stored metadata about the item based on the determined item identification information, and to estimate spatial location of an item ejection target using the sensed item data and the stored metadata, and a diversion apparatus controlled in accordance with the estimated spatial location of the item ejection target, to divert the item from the conveyor to a destination.

The disclosure also provides support for a method comprising the acts: obtaining image data corresponding to an item on a conveyor, from the image data, determining attribute data for each of plural image zones, discerning an identity of the item from the image data, obtaining metadata corresponding to said item identity, the metadata including template data that comprises first attribute data for a first area of the item and second attribute data for a second area of the item, establishing an orientation frame of reference for the item from the image data, determining one or more possible placements of said plural image zones that is consistent with said first and second attribute data, and from the one or more placements, estimating a location of an ejection target for the item. In a first example of the method in which the metadata includes data indicating a distance between the first and second areas. In a second example of the method, optionally including the first example in which the metadata includes data indicating an area of the item that is not watermarked. In a third example of the method, optionally including one or both of the first and second examples in which the attribute data for the first of said plural image zones is determined by a process selected from the list: watermark decoding, spectroscopy, image fingerprinting, neural network analysis, or optical character recognition. In a fourth example of the method, optionally including one or more or each of the first through third examples in which the attribute data for the second of said plural image zones is determined by a process selected from said list that is different than the process by which the attribute data for the first of said plural image zones is determined. In a fifth example of the method, optionally including one or more or each of the first through fourth examples in which the attribute data for one of said plural image zones is determined by a process selected from the list: watermark decoding, image fingerprinting, neural network analysis, or optical character recognition. In a sixth example of the method, optionally including one or more or each of the first through fifth examples that includes determining attribute data for first and second of said plural image zones by digital watermark decoding, said first and second image zones not being zones of a common clump. In a seventh example of the method, optionally including one or more or each of the first through sixth examples in which the metadata includes data indicating a desired location of the ejection target. In an eighth example of the method, optionally including one or more or each of the first through seventh examples in which the metadata omits data indicating a desired location of the ejection target. In a ninth example of the method, optionally including one or more or each of the first through eighth examples in which said plural image zones have a spatial relationship defining a constellation, wherein the method includes determining one or more possible placements of said constellation that is consistent with said first and second attribute data. In a tenth example of the method, optionally including one or more or each of the first through ninth examples in which said attribute data for the first area of the item indicates that said first area is unwatermarked and has a height, said constellation having a region of at least said height in which watermark data is not detected, wherein said unwatermarked first area of the item indicated by the template data establishes a constraint limiting placement of said constellation. In an eleventh example of the method, optionally including one or more or each of the first through tenth examples that includes determining plural possible placements of said constellation that is consistent with the first and second attribute data, and defining from said alternative placements an area within which the ejection target is located. In a twelfth example of the method, optionally including one or more or each of the first through eleventh examples that includes iteratively adjusting placement of said constellation to optimize a metric, and estimating a location of the ejection target based on a placement of said constellation that yields the best metric. In a thirteenth example of the method, optionally including one or more or each of the first through twelfth examples in which said template data indicates shape and size of one or more watermark areas. In a fourteenth example of the method, optionally including one or more or each of the first through thirteenth examples in which said template data indicates boundaries of one or more templated watermark areas. In a fifteenth example of the method, optionally including one or more or each of the first through fourteenth examples in which a first of said image zones is captured by a first image sensor system, and a second of said image zones is captured by a second image sensor different than the first image sensor system. In a sixteenth example of the method, optionally including one or more or each of the first through fifteenth examples that includes activating an ejection mechanism in accordance with said estimated location of the ejection target.

The disclosure also provides support for a method that includes the acts: determining identification information for a waste item on a conveyor, by processing image data that depicts said item on said conveyor, using said identification information to obtain metadata about said item, said metadata indicating that the item originally comprised a body portion of a first plastic, and a second portion of a second, different plastic, and diverting the item from the conveyor to a destination, wherein the method further includes: detecting an area of the second plastic on the conveyor, determining a frame of reference for the item as depicted in the image data, using said determined frame of reference in evaluating whether said detected area of the second plastic comprises part of said item, and establishing an ejection target for said diverting in accordance with an outcome of said evaluating. In a first example of the method in which said evaluating concludes that the detected area of the second plastic comprises part of said item, and the method includes establishing the ejection target to eject the item, taking into account said detected area of the second plastic. In a second example of the method, optionally including the first example in which said evaluating concludes that the detected area of the second plastic does not comprise part of said item, and the method includes establishing the ejection target to eject the item, not taking into account said detected area of the second plastic. In a third example of the method, optionally including one or both of the first and second examples in which said metadata includes location data indicating an original location of said second portion on said item, and the method includes using said location data in evaluating whether said detected area of second plastic comprises part of said item. In a fourth example of the method, optionally including one or more or each of the first through third examples in which the metadata includes template data indicating locations of one or more regions of the item that were originally marked or unmarked with digital watermark payload data corresponding to said item, the method including: decoding said digital watermark payload data from one or more image zones within said image data, said one or more zones defining a spatial constellation of image zones, identifying one or more possible placements of said constellation that is consistent with said template data, and establishing said ejection target in accordance with said one or more possible placements. In a fifth example of the method, optionally including one or more or each of the first through fourth examples in which the template data indicates said locations of the one or more regions relative to a feature of the item discernible from the image data and said determined frame of reference, such as a bottom of the item. In a sixth example of the method, optionally including one or more or each of the first through fifth examples in which the template data indicates data locating a 30 desired ejection target relative to a feature of the item discernible from the image data and said determined frame of reference, such as a bottom of the item. In a seventh example of the method, optionally including one or more or each of the first through sixth examples in which the metadata includes template data indicating location of said second portion of the second plastic relative to said body portion of the first plastic, the method including: identifying plastic type for each of plural zones in the image data, including identifying one or more of said plural zones as being of the second plastic type, said one or more zones defining a spatial constellation of image zones, identifying one or more possible placements of said constellation of image zones that is consistent with said template data, and establishing said ejection target in accordance with said one or more possible placements. In an eighth example of the method, optionally including one or more or each of the first through seventh examples in which the template data indicates location of a third portion of said item, of a plastic different than the first plastic, the template data indicating that the second and third portions are not adjoining and are spaced apart, wherein: a further one of said plural zones is identified as of said plastic different than the first plastic, the spatial constellation of image zones including said further zone, and the method includes identifying one or more possible placements of said constellation of image zones, including said further zone, that is consistent with said template data.

The disclosure also provides support for a method that includes the acts: obtaining image data including data depicting plural items on a conveyor, from the image data, determining attribute data for plural image zones, determining a segmentation of said image data that identifies a candidate boundary for a single item on the conveyor, discerning an identity for said single item from image data included within the candidate boundary, obtaining metadata corresponding to said item identity, checking said candidate boundary against said metadata, and determining that said candidate boundary is inconsistent with the metadata. In a first example of the method that further includes not targeting ejection of said single item from the conveyor in accordance with said candidate boundary.

The disclosure also provides support for a plastic container having a side surface, and a bottom surface orthogonal to the side surface, wherein the side surface is marked with a first digital watermark pattern having a first plural-bit payload, and the bottom surface is marked with a second digital watermark pattern having a second plural-bit payload, the first and second payloads being identical. In a first example of the system in which the first digital watermark pattern comprises plural edge-adjoining first watermark signal tiles, and the second digital watermark pattern comprises one or more of said first watermark signal tiles. In a second example of the system, optionally including the first example in which no watermark signal tile of the second digital watermark pattern is edge-adjoining with a watermark signal tile of the first digital watermark pattern.

The foregoing and additional features and advantages of the present technology will be more readily apparent from the following detailed description, which proceeds with reference to the accompanying drawings.

BRIEF DESCRIPTION OF THE DRAWINGS

FIG. 10 shows a data structure, e.g., in a database, identifying metadata, including template data, corresponding to a waste item on a conveyor (with the item, in this instance, being identified by a plural-symbol watermark payload decoded from one of its image zones).

DETAILED DESCRIPTION

Figure 1B:
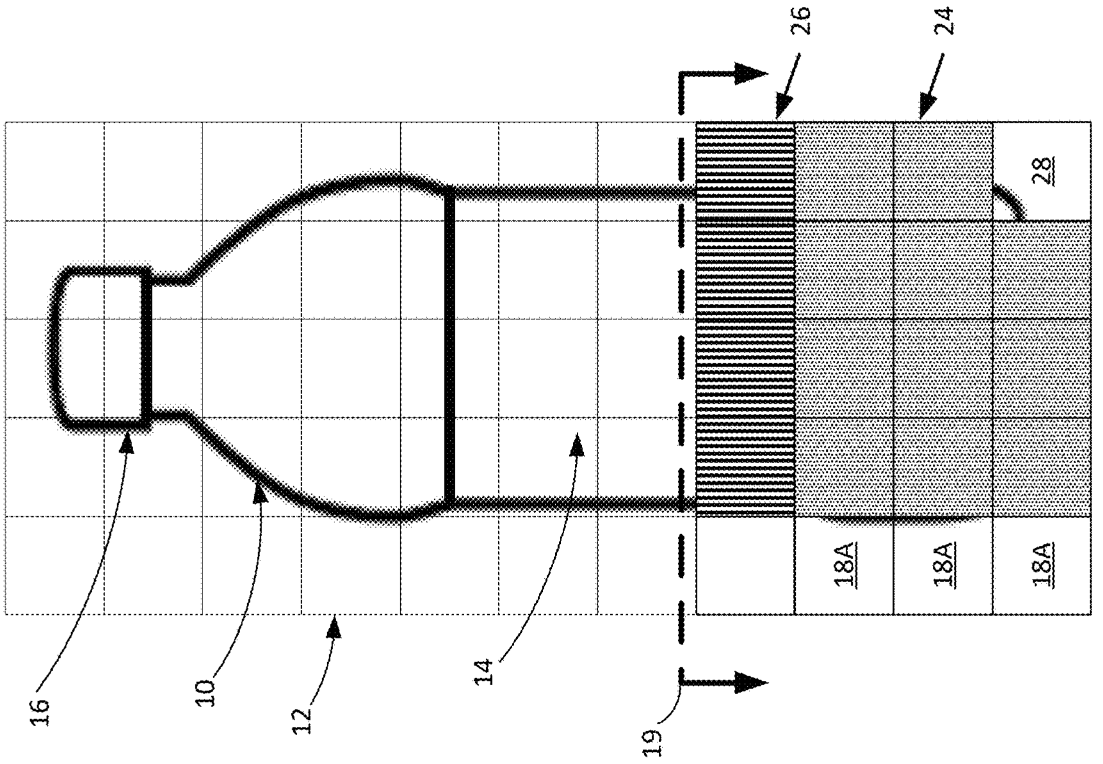
FIGS. 1A and 1B illustrate collection of imagery, and determination of attribute data, for different zones of imagery depicting a waste item on a conveyor belt.
Figure 1A:
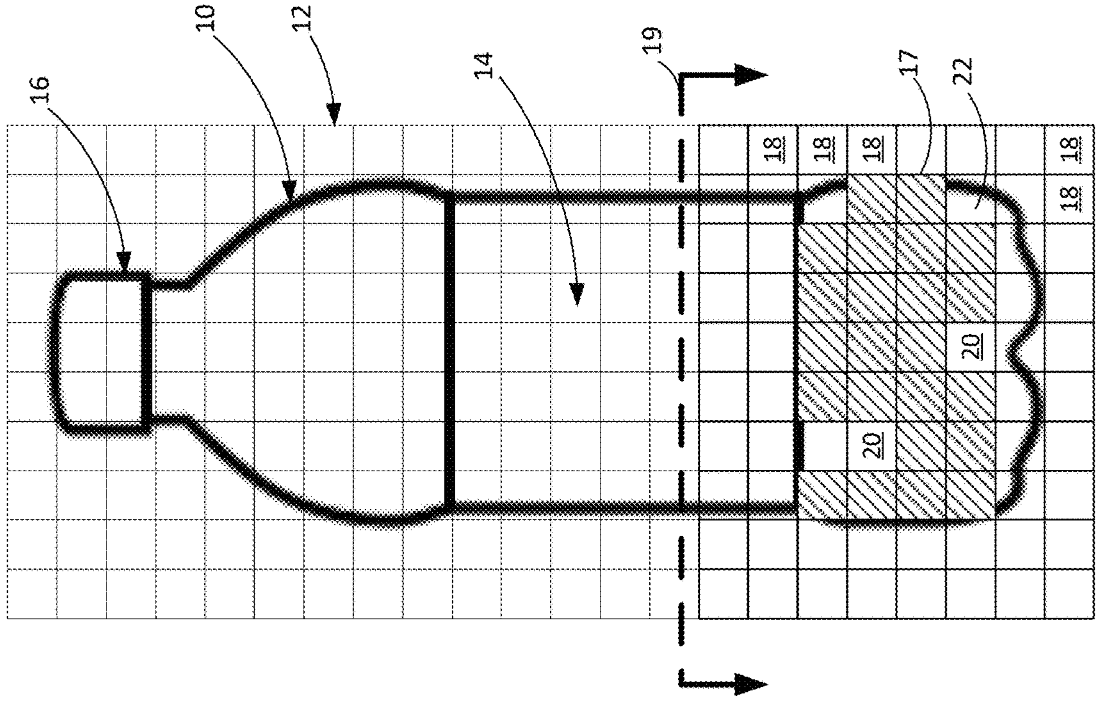

Referring to FIGS. 1A and 1B, a bottle 10 is conveyed on a conveyor 12 and is imaged by one or more camera (optical sensor) systems. The depicted bottle includes a label 14 and a cap 16.

Each camera system is employed to produce image data samples that correspond to respective areas on the conveyor belt. From the collected data, different attribute information can be discerned, such as whether corresponding areas on the belt are empty or occupied and, if occupied, information about the item(s) occupying the areas.

Different forms of analysis can be applied to the image data. In some systems, the pixels represent intensities of different spectral bands of light reflected from an item on the belt, and thereby provide color information about the item from which, e.g., color histogram data can be compiled. Such histogram information is sometimes useful in identifying distinctively-colored items (e.g., bottles bearing a red Coca Cola label).

In other systems, machine learning arrangements (sometimes termed "artificial intelligence" or "AI" systems) are employed to classify an item on the belt as matching an item with which a machine vision system has been previously trained. Convolutional neural networks may be used.

If a camera system comprises a spectrophotometer, a spectrum of illumination that is reflected (absorbed) from locations along the conveyor belt can be sensed, and matched against a reference library of spectral reflection signatures associated with known plastic resins, to thereby make an educated guess about a type of plastic resin found at each location on the belt. Near infrared (NIR, or sometimes simply "infrared") illumination is commonly employed in such systems, as may be provided by a tungsten halogen light source. An illustrative spectrophotometer camera system is the RedEye NIR hyperspectral imaging camera by inno-spec GmbH. In other arrangements, a flying-spot scanner can be employed, e.g., with a rotating faceted mirror that sweeps light from a light source to locations across the belt, and directs reflected light from the swept locations to an NIR sensor.

Relatedly, some items on a conveyor belt may be formed or printed with taggant elements (or compounds) that fluoresce under illumination in an excitation spectrum-emitting a fluorescence in a different spectrum. Such fluorescence can be detected from the camera data (e.g., from spectrophotometer data) and serve to indicate the presence and spatial extent of certain tagged items on the conveyor belt.

An emerging type of analysis that can be applied to image data depicting items on a conveyor belt is digital watermark decoding. As detailed in the earlier-referenced patent documents, a container substrate can be textured, or the container label can be printed, to convey a pattern that redundantly encodes a plural-bit payload. The payload can comprise, e.g., a 50 bit identifier. This identifier can serve as an index into a database of metadata information associated with the watermarked item. This metadata can comprise data of various types.

In accordance with aspects of the present technology, this metadata can include at least one of: (a) item catalog data indicating a set of plural different components comprising the item; (b) template data indicating physical shape of the item, and/or layout data indicating shapes, spatial positioning and/or relationships of different components parts/areas, and/or information indicating the plastic resin(s) of which the item and its components are comprised; and (c) location of an optimum ejection target relative to one or more other item landmarks.

One illustrative arrangement employs both digital watermarking and NIR spectroscopy. In a particular such implementation, two camera systems are used-one to collect image data for digital watermark analysis and one to collect image data for NIR spectroscopy. (The former may employ a 2D image sensor while the latter may employ a 1D line sensor, although this is not essential.) FIG. 1A depicts the bottle 10 in connection with the digital watermark data, while FIG. 1B depicts the same bottle in connection with associated spectroscopy data. Each camera system provides image data that is processed to discern information about spatial zones (sometimes termed areas, blocks, or locations) 18, 18*a* arrayed across the belt. In this example, the zones are of different sizes, with the watermarking analysis yielding information at a higher spatial resolution on the belt than the NIR system.

For instance, the watermark camera may have a resolution that produces pixel samples depicting the belt and its contents at a resolution of 150 pixels per inch of belt. This imagery may be analyzed in square excerpts 18, sometimes termed zones, that are 32 pixels on a side, i.e., corresponding to belt areas of about 0.2 inches on a side. (For clarity of illustration, the figures are not to scale.)

In some embodiments, the analysis is conducted on overlapping zones, e.g., overlapping each other by 16 pixels both horizontally and vertically. However, to simplify the following discussion we assume the zones do not overlap.

The NIR camera may have a resolution that produces pixel samples at 100 pixels per inch of belt. This imagery may be analyzed in zones 18*a* that are 40 pixels on a side (i.e., corresponding to belt areas of about 0.4 inches on a side).

The moving belt transports items past the stationary camera systems, providing sequences of image frames that depict the items at different positions in their travels, as they pass through fields of view of the imaging systems. This imagery can be buffered and combined with earlier image data, permitting analysis of composite 2D imagery that includes portions depicting parts of items that are no longer in camera view.

At the instant depicted in FIGS. 1A and 1B, the camera systems have captured (and associated analysis systems have processed) data for the regions of the belt depicted in the lower portion on the figures, below the bold dashed lines 19. For each zone 18 in the processed region of FIG. 1A, the watermark system has produced—where possible—first attribute data. This first attribute data can be payload data decoded from a watermark pattern detected in the zone, or it may be associated metadata obtained through use of decoded payload data. Similarly, each zone 18*a* in the processed region of FIG. 1B has been analyzed by NIR spectroscopy, and many of the analyzed zones have yielded second attribute data. This second attribute data can be data identifying the type of plastic resin likely occupying that zone, as determined from spectroscopy. Or it may be related data, such as the sensed NIR reflection spectrum (signature) itself.

Within the processed imagery in FIG. 1A, common first data is identified in several zones. These zones 17 are shown in cross-hatch. That is, in these cross-hatched zones, an analysis process has successfully decoded watermark payload data, and the payload data for all of these regions matches.

The cross-hatched zones in FIG. 1A are all neighbors to each other. "Neighbors" (and "neighboring") refers to image zones that are adjacent each other. Adjacency can include not just edge-adjoining, but also corner-adjoining. Neighboring zones that all share the same (i.e., common) first data are concluded, with high confidence, to all depict parts of a common, single item 10. (As is familiar to artisans, a connected-component labeling analysis, such as a blob growing algorithm, can be used to identify all neighboring zones that have common first data. Such a collection of neighboring zones, which share a common attribute such as the first data, is sometimes termed a "clump.")

The decoded watermark payload data can serve as an index into a database that stores associated metadata for different items. The payload data decoded from the cross-hatched zones 17 in FIG. 1A may be associated with metadata indicating that the item is, e.g., a 500 ml Aquafina brand water bottle, made of bisphenol-free PET (polyethylene terephthalate), with a retail GTIN code of 00012000001086, bottled by The Pepsi Bottling Group México, S. de RL de CV. having a height of 8 inches, a diameter of 2.5 inches, etc., etc.

Note that the watermark payload attribute data is not detected in all zones within the processed part of the bottle 10. Examples are zones 20. This may be due to glare, soiling, or other cause that interferes with decoding. Other such examples are found at the bottom and edges of the bottle, where curvature of the bottle significantly distorts the appearance of the watermark (e.g., zone 22). Still other examples are found where the area encompassed by a zone simply does not span much of the item; where most of the zone depicts only belt, with too little watermark pattern to decode.

In FIG. 1A example, no watermark payload is decoded from the processed part of the label area 14 of the item. The label hides the bottle surface that is textured with the watermark pattern, preventing watermark decoding from such zones. (The label itself is not watermark-encoded in this example, although in other situations the label may be watermark-encoded, by printing.)

Turning to FIG. 1B, analysis of the zones 18A in the NIR imagery reveals additional, second attribute data. In some zones 24 (indicated with a first form of shading), NIR spectroscopy analysis may reveal the presence of a PET plastic on the belt. In other zones 26 (indicated with a second form of shading), analysis may reveal the presence of polyethylene ("PE") plastic on the belt. In this particular case, the two different types of plastic are components of a single plastic bottle. (The bottle substrate is made of PET; a shrink-sleeve label on part of the bottle is made of PE.) In other cases, however, detection of two different plastic types in neighboring belt areas may be due to two different items lying in proximity, or with one item overlying the other on the belt.

No plastic information is discerned from zone 28 in FIG. 1B, because the plastic occupies such a small fraction of the area. Generally, however, spectroscopy is over-inclusive in its identification of zones by plastic type, as is evident from the three shaded areas along the right side of FIG. 1B. Most of these zones span belt areas that are not occupied by the bottle. Yet the spectroscopy signature of PET can be detected in the reflected illumination because the black conveyor belt reflects essentially no illumination-leaving the small regions of plastic as the only sources of reflected light, and their reflected spectra are found to match reference spectra corresponding to PET and PE.

It will be seen that FIG. 1B shows two clumps. A first clump comprises the zones 24 identified as PET, and a second clump comprises the zones 26 identified as PE. These two clumps adjoin each other but, as discussed below, clumps corresponding to a single item can be non-adjoining, i.e., disjoint.

Figure 2B:
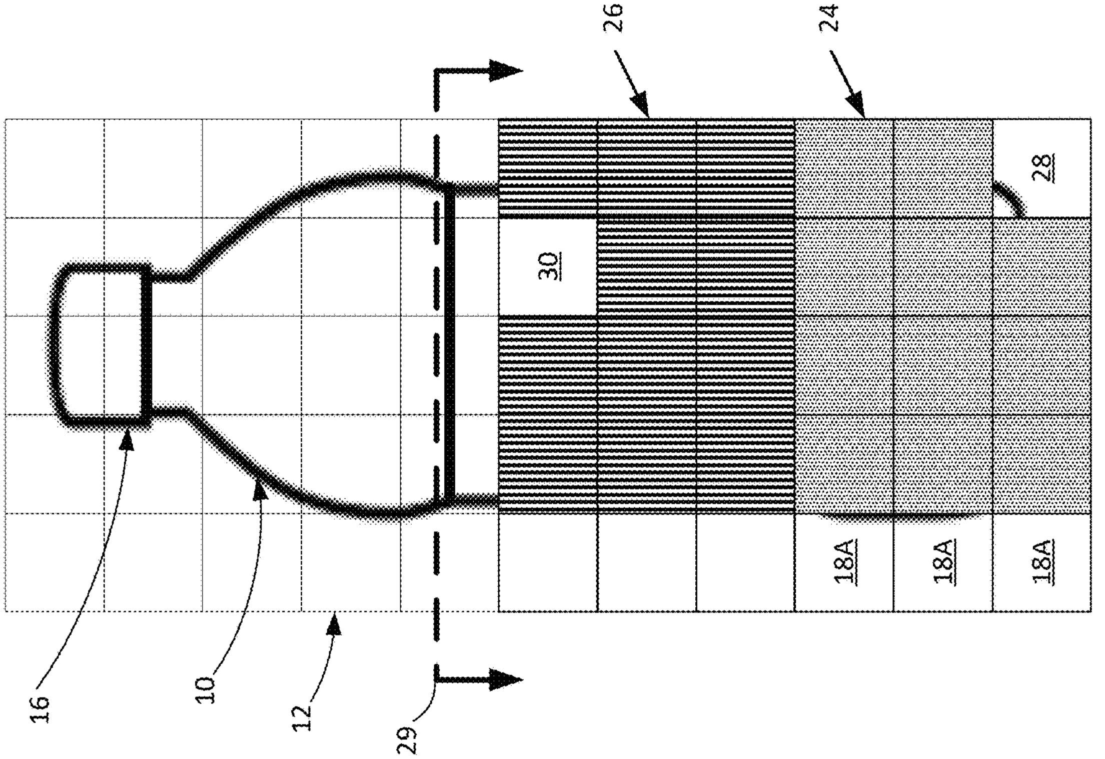
FIGS. 2A and 2B are like FIGS. 1A and 1B, but at a later instant in time-after more imagery has been collected, and more attribute data has been determined.
Figure 2A:
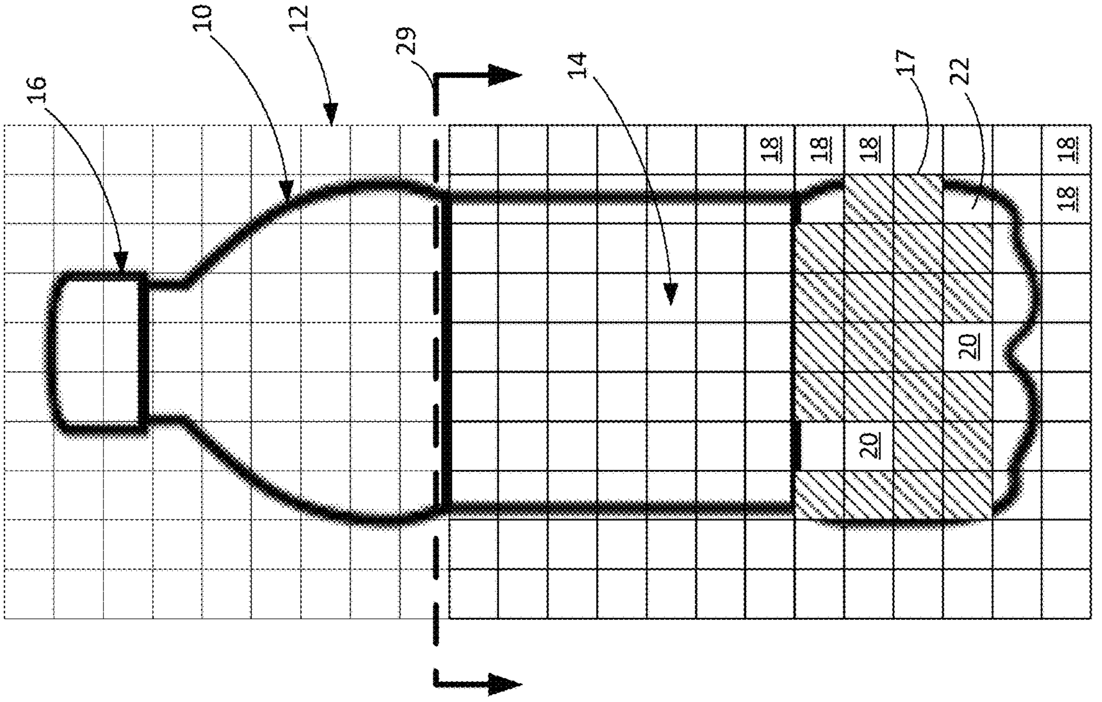

FIGS. 2A and 2B show the scanning status a few instants later, after the belt has moved the bottle to permit capture of more imagery by the cameras. In these figures, image zones under the dashed line 29 have been processed. As shown by FIG. 2A, no further watermark payload data has been decoded. None is present on the label (nor on the belt). In FIG. 2B, however, it can be seen that additional zones of imagery have been identified as depicting PE, i.e., more of the bottle label. These zones are identified by the cross-hatching 26. Again, these identifications tend to be over-inclusive, identifying zones where even a part of the item is depicted in the zone. Zone 30 is not identified as PE. This may be due to soiling that obscures this part of the label.

Figure 3B:
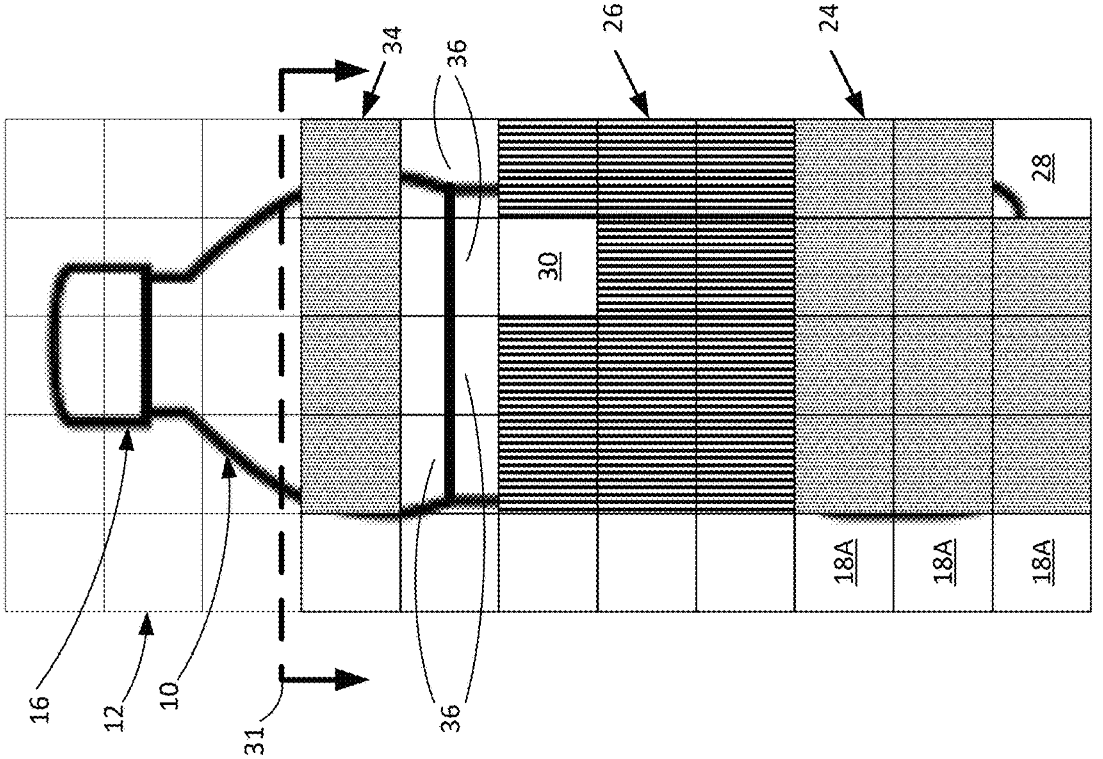
FIGS. 3A and 3B are like FIGS. 2A and 2B, but at a still later instant in time-after more imagery has been collected, and more attribute data has been determined.
Figure 3A:
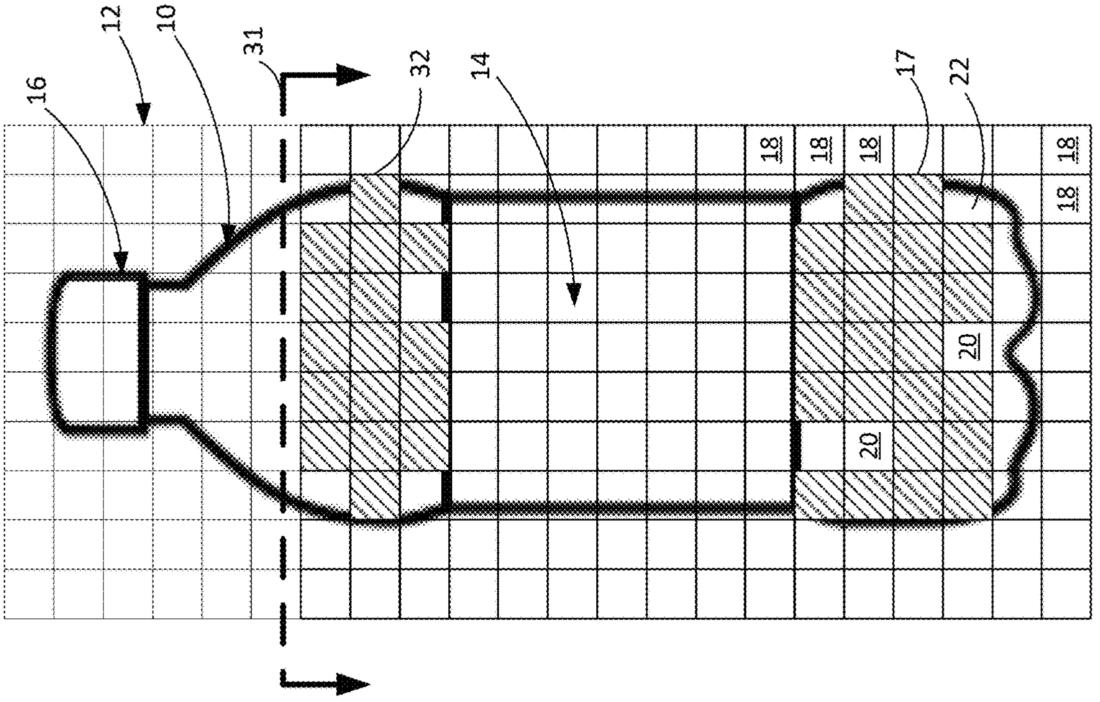

FIGS. 3A and 3B show the situation a few instants later, after the belt has transported the bottle further, permitting more image data to be collected and analyzed. At this stage, image zones below the dashed line 31 have been processed.

In FIG. 3A, the cross-hatching indicates that a watermark payload has been decoded from many further image zones 32, and that these payloads match each other. Moreover, these payloads match the payloads decoded from the cross-hatched image zones 17 earlier introduced in FIG. 1A (i.e., the watermark whose metadata identifies the Aquafina water bottle). It is not yet clear, however, whether these two cross-hatched regions (comprising zones 32 and zone 17) belong to a single Aquafina bottle, or whether they may be due to two identical Aquafina bottles near each other on the belt.

Turning to FIG. 3B, it can be seen that spectroscopy has identified several further image zones 34 as being occupied by PET plastic. However, beneath those zones is a row of zones 36 that spectroscopy has failed to identify. In this instance, this is due to each of the image zones 36 spanning two different types of plastic—the PE label and the PET bottle substrate. Each plastic reflects a different spectrum of light to the camera, and the sum of the two spectra matches none of the reference plastic signatures in the spectroscopy system's reference library.

As with the disjoint clumps of watermark-identified Aquafina water bottle image zones 32 and 17 in FIG. 3A, there is an ambiguity—it is not known (from the FIG. 3B data) whether the disjoint clumps of PET-identified image zones 34 and 24 in FIG. 3B belong to a single item, or two nearby items on the conveyor belt.

Figure 4B:
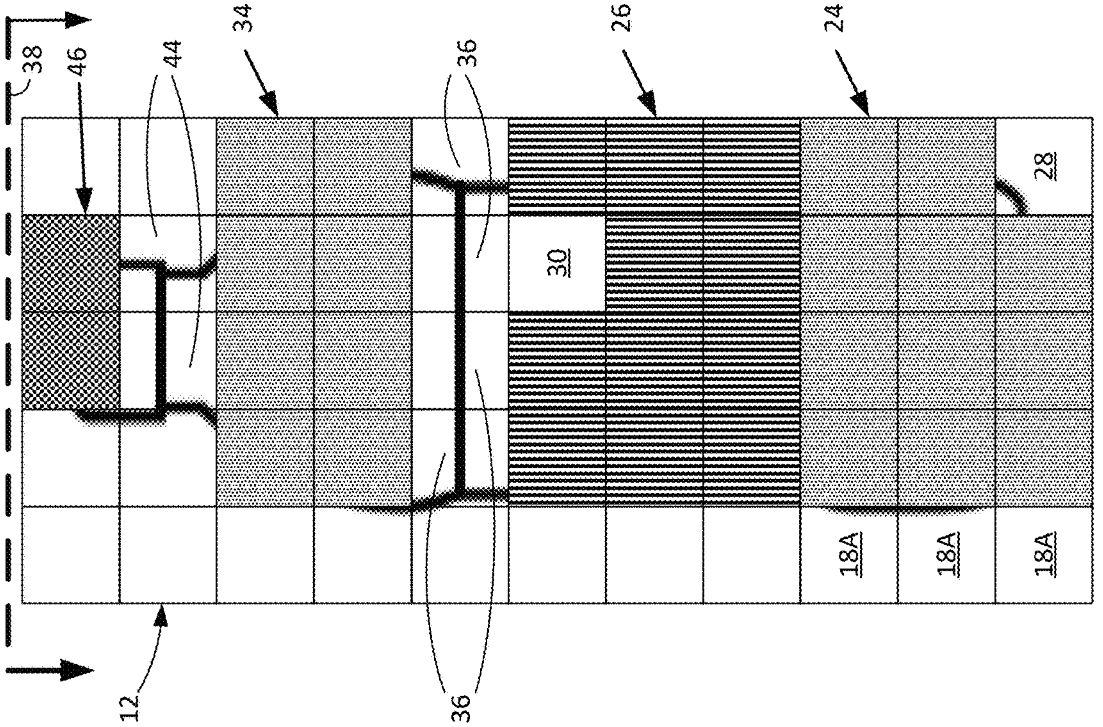
FIGS. 4A and 4B are like FIGS. 3A and 3B, but at a still later instant in time-after all imagery has been collected from the waste item, and more attribute data has been determined.
Figure 4A:
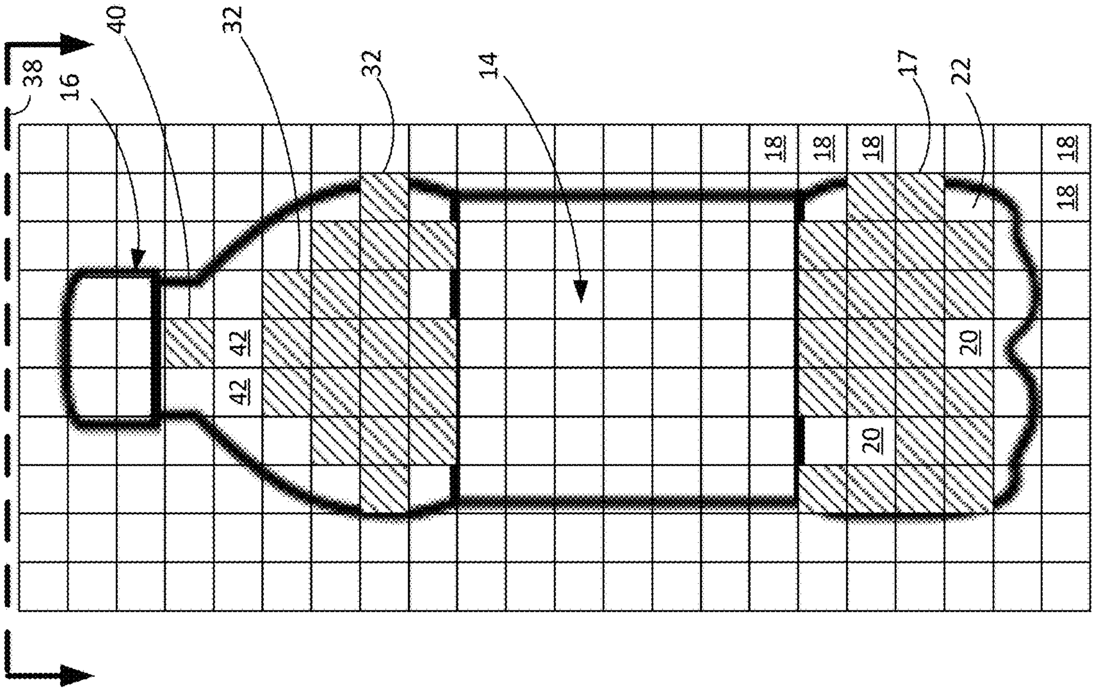

FIGS. 4A and 4B show the situation after the bottle has moved fully past the two cameras, and resulting imagery has been processed by the watermark decoding system and the NIR spectroscopy system (i.e., image capture and analysis has progressed to the dashed line 38). In FIG. 4A, several more watermark image zones 32 have been decoded and found to have the same Aquafina-associated watermark payload as found at zones 32 from FIG. 3A (and zones 17 from FIG. 1A). There is also an isolated watermark image zone 40 decoded with the same payload. However, this zone is separated from zones 32 by a region of image zones 42 without decoded payloads. This may be due, e.g., to the angled orientation of the shoulder of the bottle, glare, or soiling, which prevents decoding in this region.

Although image zones span the bottle's plastic cap 16 in FIG. 4A and have been analyzed for the presence of watermark data, no such data has been found. In this example, the Aquafina cap is not watermarked.

In FIG. 4B, additional NIR image zones 34 have been identified as comprising PET plastic—adjoining PET zones 34 from FIG. 3B. Again, the imagery includes some zones 44 that span plastic, but whose spectral reflectance fails to match any signature in the spectroscopy system's collection of known plastic reference signatures. As with image zones 36, this failure is due to the presence of two different plastics within the area of each such image zone; their combined reflectance does not match any known signature. At the top of FIG. 4B, the spectroscopy system has identified two zones 46 of a different plastic, namely polypropylene (PP). In this example, the bottle cap is made of PP.

Figure 5B:
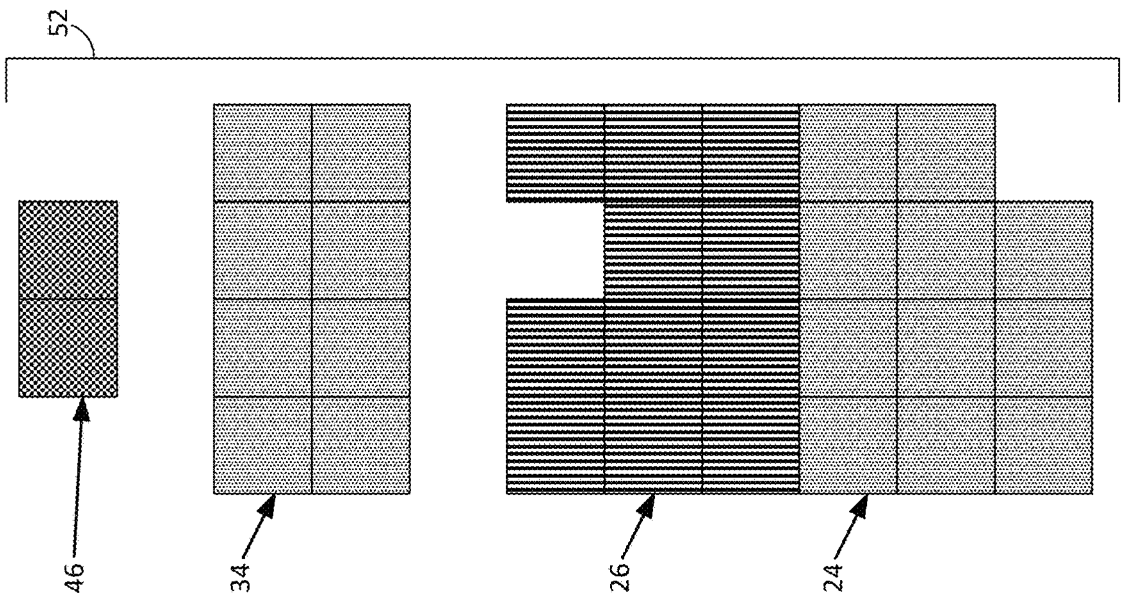
FIG. 5B illustrates three clumps of spectroscopy image zones, with one clump spanning two different types of plastic.
Figure 5A:
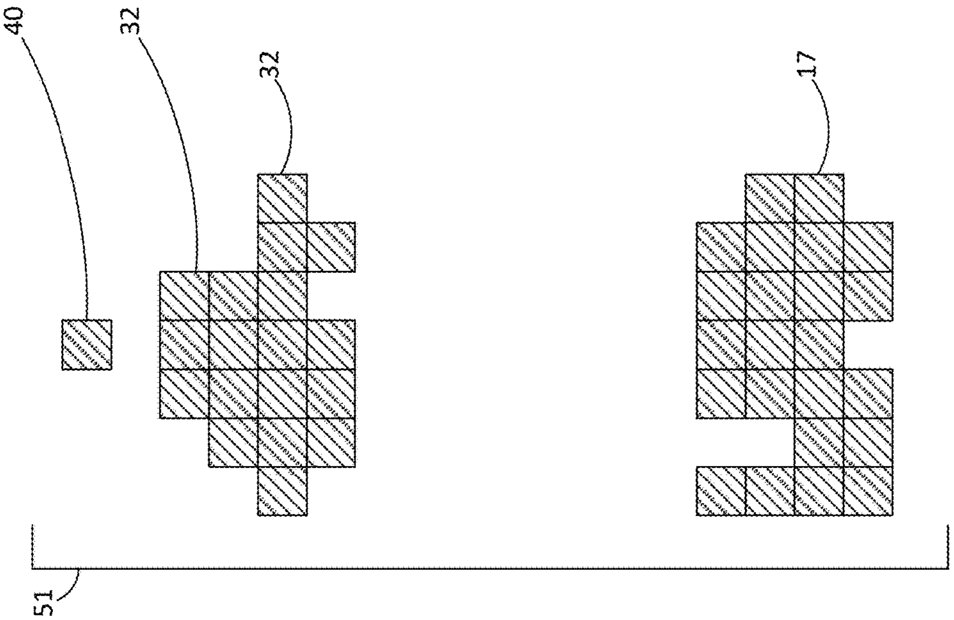
FIG. 5A illustrates three clumps of watermark image zones.

FIGS. 5A and 5B summarize the results of the watermark image analysis and the spectroscopy image analysis. Three disjoint clumps of watermark image zones are indicated by the watermark data 51. Four clumps of spectroscopy image zones, four regions of three different plastics, are indicated by the spectroscopy data 52.

The challenge is: what to make of this data? Do these FIGS. 5A and 5B data indicate a single item, or multiple items? And at what belt location should a diverter (e.g., an air-jet or a robotic manipulator) be targeted to try to eject such item(s) into a collection bin? One approach to targeting ejection is to apply stored rules to the sensed data to identify individual items, and then estimate the center of gravity of each individual item. This center of gravity serves as the target of an air-jet or other ejector. As will be shown, however, rule-based approaches to identifying what constitutes an individual item are prone to error.

Consider a rule based on image segmentation, employing the watermark data of FIG. 5A. Such a rule may specify that image zones with the same payload, which neighbor each other or are separated by a threshold distance of eight zones or less, should be assumed to depict a single object. (If the zone size is 32×32 image pixels, then this threshold distance is 256 pixels.) In such case, diversion could be targeted to the center of the smallest bounding rectangle that encompasses all such zones. ("Segmentation" is here used in its familiar image processing sense, of partitioning image data to identify an excerpt corresponding to a single object. In this instance, it refers to determining a spatial boundary that encompasses an item.)

Figure 6B:
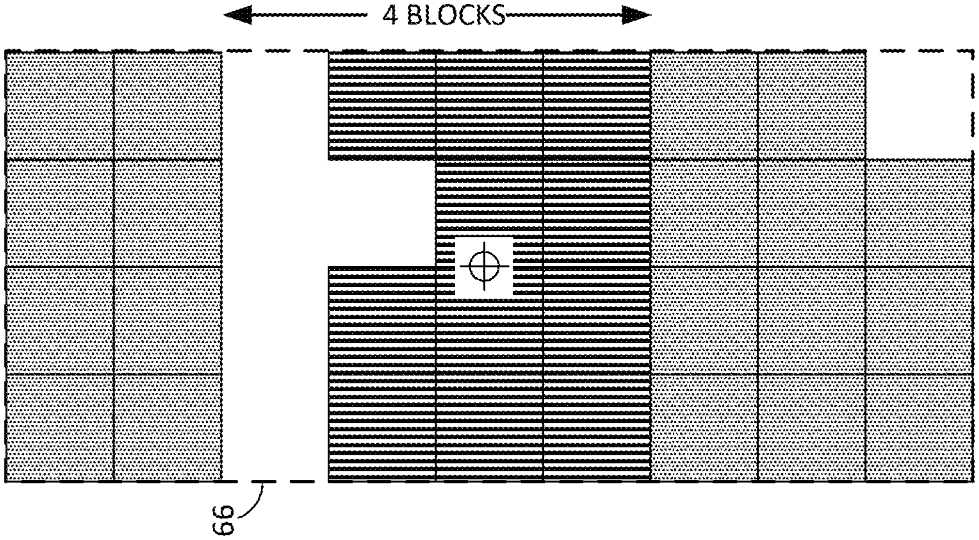
FIG. 6B shows application of a segmentation heuristic by which a segmentation of the clumps of spectroscopy image zones of FIG. 5B is produced, based on their spacing being a threshold distance of each other, and showing an ejection target identified as the center of the segmented region.
Figure 6A:
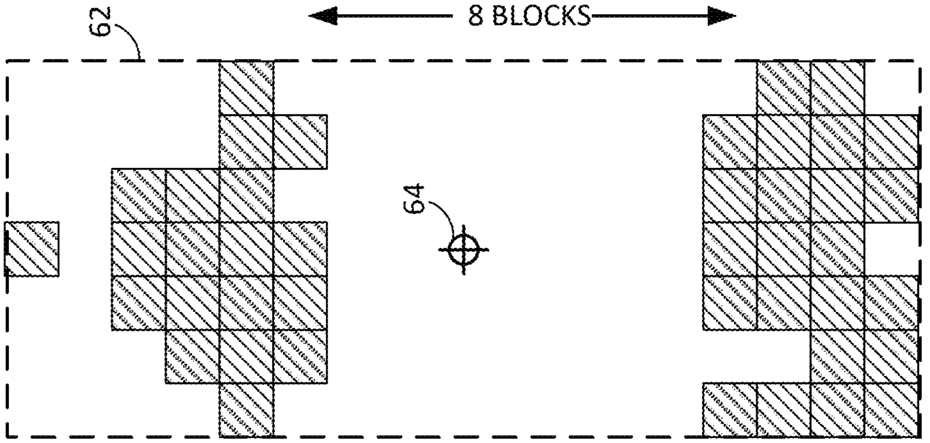
FIG. 6A shows application of a segmentation heuristic by which a segmentation of the clumps of watermark image zones of FIG. 5A is produced, based on their spacing being within a threshold distance of each other, and showing an ejection target identified as the center of the segmented region.

FIG. 6A shows application of such a rule, with a bounding rectangle 62 and a diversion target 64 at its center.

It will be recognized, however, that this rule often proves unsatisfactory. For example, if circumstances happen to cause clumps of decoded image zones to be separated by more than the threshold distance, then the data will be interpreted as indicating two distinct items. Diversion will then be targeted first at one, and then the other, of the two islands (e.g., as the two regions successively reach an air-jet ejection bar at an end of the conveyor belt). The bottle will be sent tumbling in an unintended direction with operation of the first air-jet.

The contrary situation can also occur. Two Aquafina bottles may be near (or overlie) each other on the belt-so that their clumps of common payload zones are within the threshold distance of each other. The stated rule will cause the two bottles to be regarded as a single item, and diversion (e.g., an air-jet) will be targeted at the middle of the bounding box: often at a gap between the two bottles. Again, the desired diversions do not occur.

The threshold distance used in the rule can be enlarged to help the former situation, but the latter situation is then worsened.

Such an image-segmentation/ejection-targeting rule can also be applied to disjoint clumps of spectroscopy image zones that are identified as comprised of a common plastic. FIG. 6B shows a resulting bounding box 66 and target, based on the common identification of PET plastic in two spaced-apart clumps of image zones (here separated by image zones variously identified as polyethylene or not identified at all), assuming a threshold distance of 4 image zones (i.e., 160 pixels or less in the spectroscopy imagery).

Figure 7:
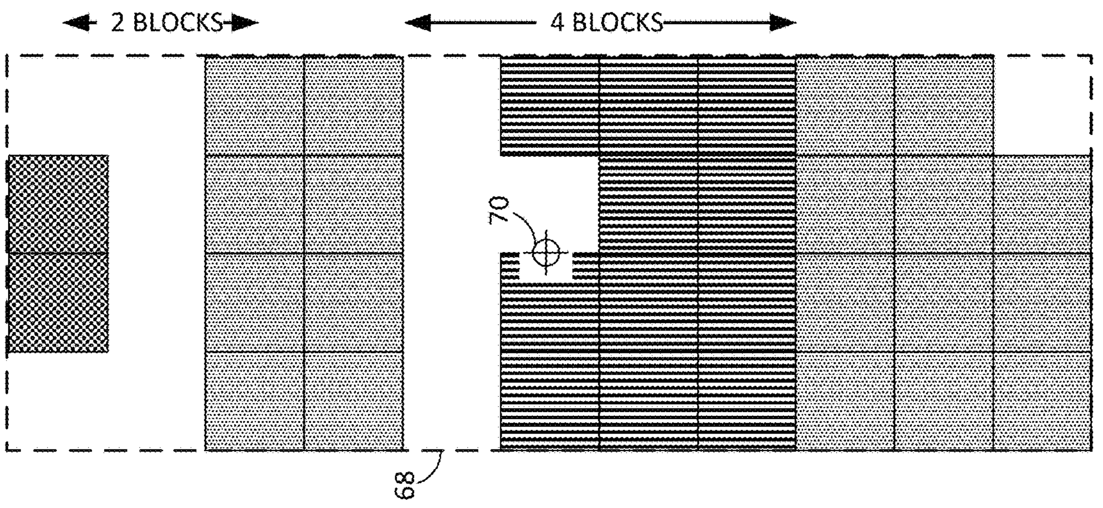
FIG. 7 is similar to FIG. 6B, but shows application of a more complicated segmentation heuristic that takes into account a cap made of polypropylene within a threshold distance of another clump.

In addition to the earlier-noted shortcomings, it will be noted that the PP cap, although identified by the spectroscopy analysis, is not included within the FIG. 6B bounding box. This failing can be remedied by a more complex image-segmentation rule. Per such a revised rule, if a small area of PP (e.g., a clump of four or fewer spectroscopy image zones less) is identified within two image zones (80 pixels) of a PET zone, then the PP and PET zones are to be treated as part of a single item. Application of such a revised rule is shown in FIG. 7. Spectroscopy image zones depicting the cap are now included in the bounding box 68, and the ejection target 70 is centered within the bounding box accordingly.

Figure 8:
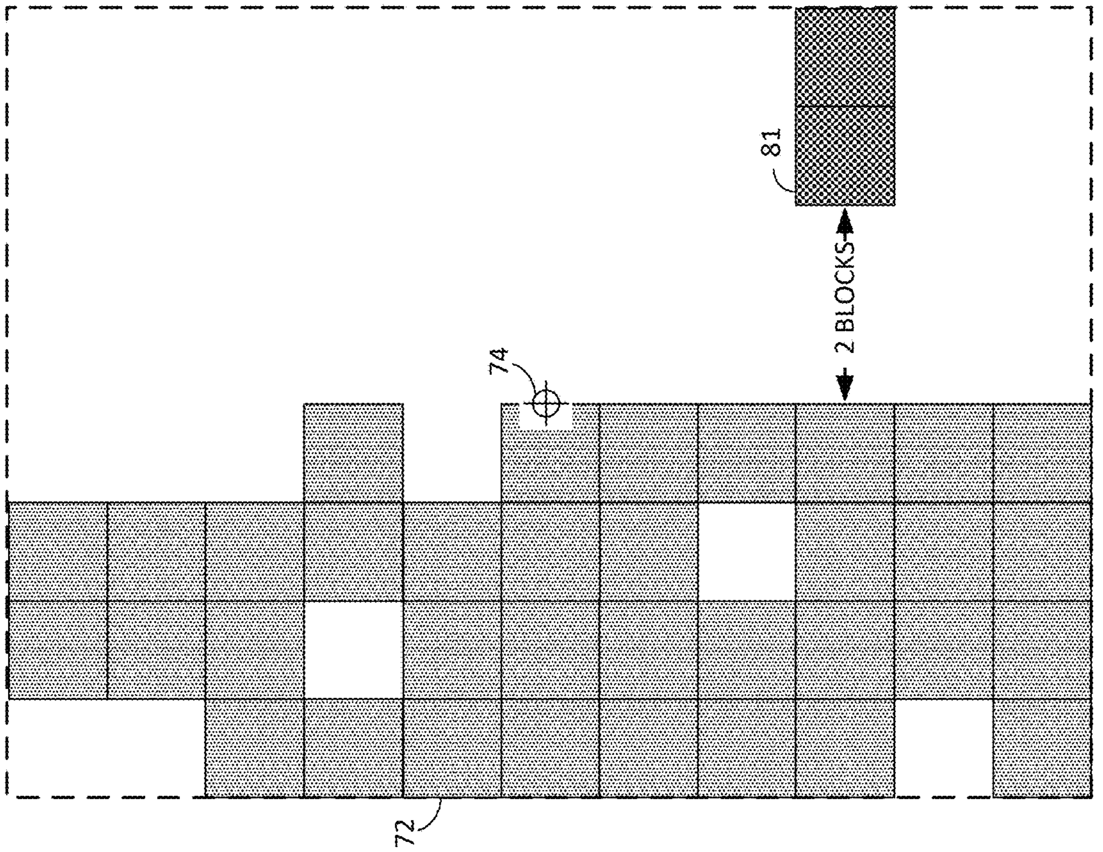
FIG. 8 illustrates how the more complicated segmentation heuristic applied in FIG. 7 can yield erroneous results, encompassing a loose polypropylene cap on the conveyor belt, and leading to positioning of an ejection target that will result in mis-ejection of the bottle.

However, this “fix” introduces a further fault. Referring to FIG. 8, if there is a loose PP cap on the belt, indicated by zones 81, and it is located within two spectroscopy image zones of a PET bottle (say an Aquafina water bottle), then the revised rule will enlarge the bounding box for the bottle to encompass the loose cap, and the diversion target will be skewed. The result is an over-large bounding box 72, and a poorly-placed target 74. This target is likely to result in mis-ejection.

Figure 9:
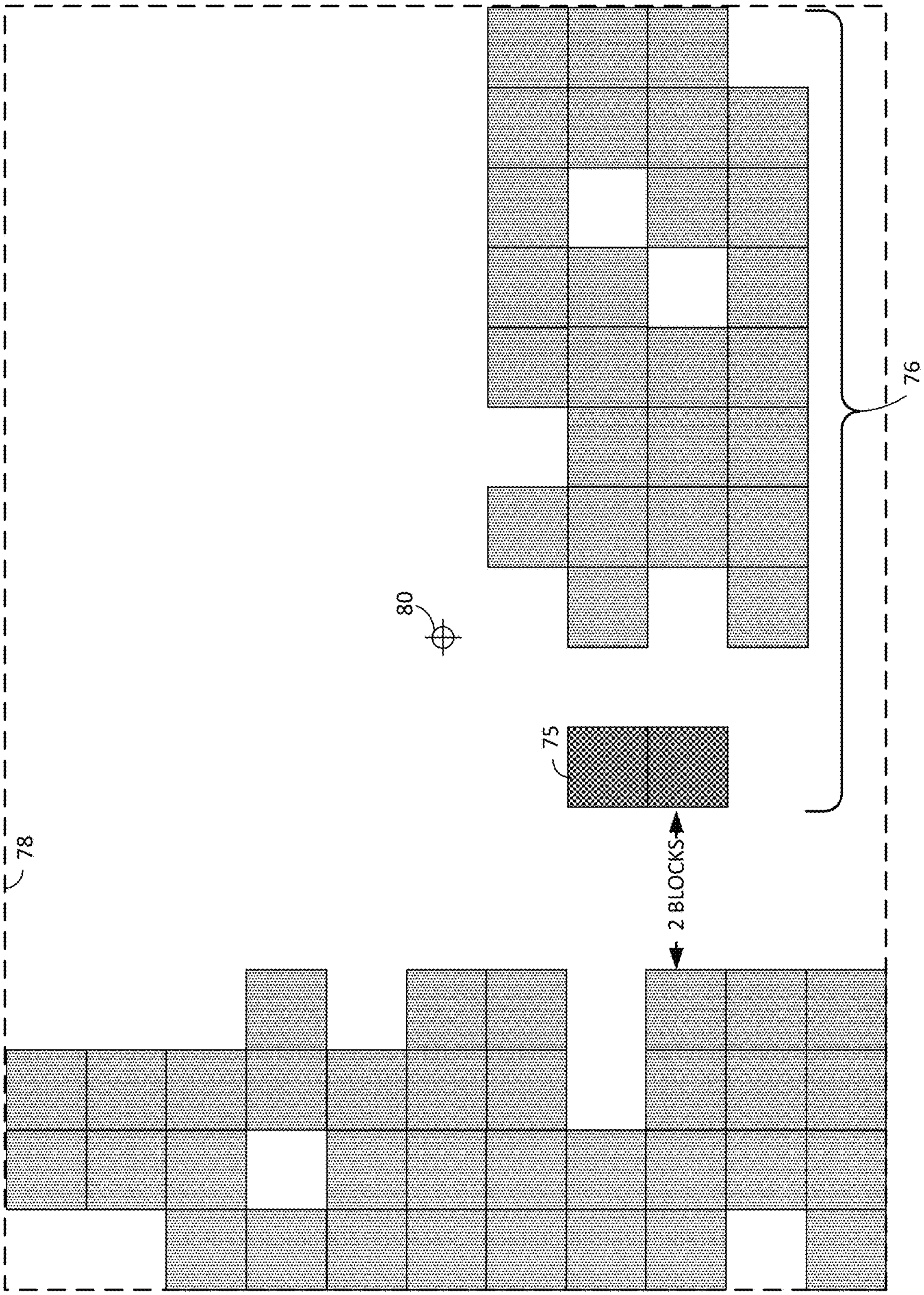
FIG. 9 illustrates a further unintended consequence of the segmentation heuristic of FIG. 7—this time encompassing the entirety of a second bottle and cap, which will lead to mis-ejection of both bottles.

Relatedly, as shown in FIG. 9, a cap 75 component of a nearby second bottle 76 may be detected, and application of the revised rule will then cause a bounding box 78 to expand to encompass the entirety of the second bottle—as well as the first bottle. Here the resultant target 80 is aimed at an empty area on the belt. Neither bottle is ejected.

The FIG. 9 problem can be mitigated by specifying a maximum size for the bounding box and, if the image-segmentation rule would exceed this size, then to apply a further rule. But that further rule—however specified—will introduce unintended consequences of its own. Etc., etc.

As will be appreciated from these few examples, image-segmentation (boundary determining) rules that are based on common watermark payloads, common plastic types, proximate clump areas, threshold distances, etc., are of limited efficacy. Useful rules of general applicability are elusive.

In accordance with one aspect of the present technology, item data sensed from an item transported on a conveyor is used to determine item identification information for the item. Stored metadata about the item is next accessed, based on the determined item identification information. A spatial location of an item ejection target is then estimated, using the sensed item data and the stored metadata. Different implementations of this method can avoid the just-detailed failings of methods that identify an ejection target location based solely on a boundary determined by applying stored rules to sensor data.

In one particular implementation, the accessed stored metadata comprises catalog data indicating a set of plural different components comprising the identified item. If, e.g., spectroscopy data indicates a type of plastic—sensed within a rule-determined candidate item boundary—that is not included in the metadata-indicated catalog of component plastics, then the boundary is known to be incorrect. For example, if metadata accessed using decoded watermark data indicates an item is an Aquafina water bottle comprising a PET body, a PE label and a PP cap, but spectroscopy data for an image zone included within the segmented item boundary identifies a zone of polyvinyl chloride (PVC), then something is amiss. In such case, the ejection system can be instructed not to perform an ejection operation. Instead, this item remains on the conveyor belt. This and other such items may tumble off the end of the conveyor and be collected for processing a second time—this time, hopefully, in a spatial position that enables the Aquafina bottle to be presented separately from whatever the PVC component was. Such second processing may be performed by returning the bottle to the start of the same line, or passing it to a second processing line.

In an inverse situation, the sensed item data is found to be consistent with the catalog data. In such case, the item can be ejected by applying an actuation force, e.g., targeted at the center of the bounded region.

In another particular implementation, the accessed stored metadata comprises item template data. Such data can indicate physical shape of the item, and/or layout data indicating shapes, spatial positioning, and relationships of different component parts or areas of the item, and/or information indicating the plastic resin(s) of which the item and its components are comprised.

In a particular example, stored template metadata may indicate that an item includes a PP component (a cap) above a PE component (a label). If such an item is identified on a conveyor by reference to its watermark data, sensed data within a rule-proposed boundary region can be checked for consistency with this template data. (The “up” direction in the item frame of reference, i.e., item orientation information, can be determined from the watermark orientation signal component.) If, e.g., sensed spectroscopy information indicates presence of a PP component (presumably a cap) below a PE component (presumably a label), rather than above, then again something is amiss. Again, the ejection system can be instructed not to perform an ejection operation on the item.

Again, inversely, if the sensed item data is found to be consistent with the template data, the item can be ejected, by applying an actuation force, e.g., to the center of the bounded region.

In another particular implementation, the accessed stored metadata comprises template data and also comprises stored target metadata that indicates location of an item ejection target. This location may be indicated relative to one or more feature or component features of the item indicated in the template data, such as relative to the top or bottom of the item, relative to the top or bottom of an item label, relative to a PP cap component of the item, etc.

Sometimes, the landmark(s) to which the stored item ejection target is referenced cannot be pin-pointed precisely by the sensed data. Rather, there is a region within which the landmark is located, and there is thus a region within which the target is located. In such circumstances the ejection target may be estimated using a constraint-based process, in which permissible locations for the target are limited, or narrowed, in accordance with stored item metadata and sensed item data.

To illustrate, consider metadata for a Dasani bottle. A metadata database record associated with the watermark payload can include template data detailing different components of which the item is comprised, with their dimensions and/or placement locations. For example, the item metadata may indicate the following: The bottle has a PET substrate, and includes an unwatermarked polyethylene (PE) label and an unwatermarked PP cap. The PET substrate is textured to encode a watermark payload (here 266A08D7B885D). The bottle is 8.86 inches in height. Its PE label has a height of 2.85 inches. The lower edge of the label is 1.46 inches above the bottom of the bottle. The upper edge of the label is 4.54 inches below the top of the bottle. The bottle's 3D shape is approximated as a surface of rotation. This shape has a fixed radius extending up from the base (bottom) for a distance of 6.5 inches (i.e., a cylindrical section). Above that, the bottle tapers towards the cap (i.e., a truncated conical section). The cap has a diameter of 1.14 inches and a height of 0.5 inches. (Such item configuration information can be specified in 3D terms, and then projected into a 2D plane as required for image analysis. Or it can be specified in 2D terms-already in terms of depiction of the item in 2D imagery.)

The metadata may further include stored target metadata that indicates location of an item ejection target. For example, this target metadata may indicate that the desired ejection target (e.g., the bottle center of gravity 112) is at a location 3.94 inches above the bottom of the bottle. (The desired ejection target is presumed to be halfway across the bottle, widthwise, unless a different width coordinate is specified.) While the target location is here stated in terms of distance from the base, the metadata also permits the target location to be determined relative to other described attributes. For example, since the metadata states the bottom edge of the label is 1.46 inches above the base of the bottle, the target is known to be 3.94-1.46, or 2.48 inches above the bottom edge of the label. Similarly, since the label is 2.85 inches in height, this means the ejection target is 2.85-2.48 or 0.37 inches below the top edge of the label. Etc.

Figure 11:
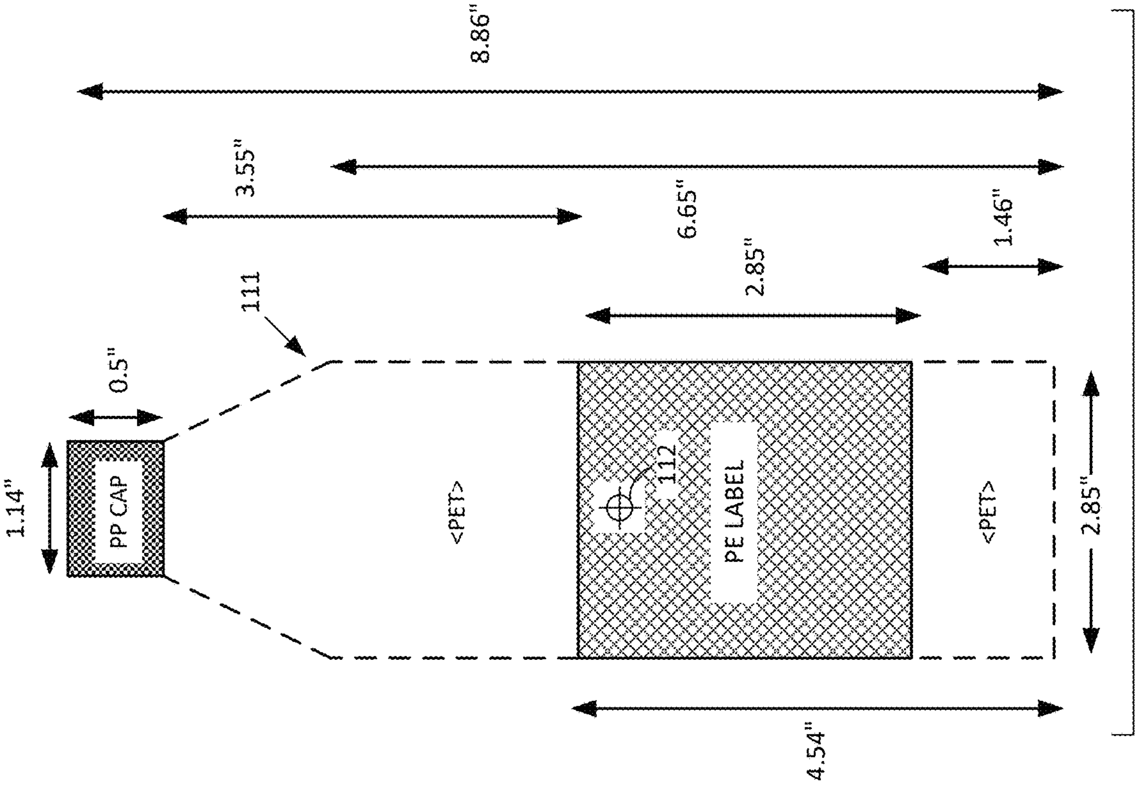
FIG. 11 graphically depicts the layout and material composition of a bottle described by template data retrieved from a data structure, such as FIG. 10.

A partial view of a metadata database containing such information is shown in FIG. 10. (Space constraints prevent presentation of more columns of metadata.) The template data may be expressed in a tagged XML schema (not detailed). FIG. 11 shows a bottle template 111 described by the metadata.

While the metadata in this example describes certain spatial features (attributes) of a bottle (including location of top and bottom label edges), it should be understood that metadata for other items may describe such items by reference to other, different features.

If the item metadata includes information indicating location of a desired item ejection target, then targeting need not employ a candidate item boundary encompassing the item, as was described above. Instead, the ejection target can be estimated directly from the sensed item data and the template data.

Such arrangements can include determining item orientation information using the sensed item data, and then estimating spatial location of an item ejection target per the stored target metadata to identify a target location that is in accordance with (e.g., is spatially consistent with) the sensed item data, the item orientation information, and the template information.

Examples will help illustrate. Several particular approaches to ejection targeting using both item orientation information and template information are detailed.

Figure 12:
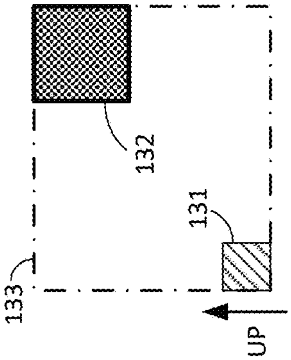
FIG. 12 shows a constellation of two image zones in a spatial relationship—one a watermark image zone, and the other a spectroscopy image zone.

A first approach is described with reference to FIG. 12. In this example the apparatus has sensed information from only one watermark image zone 131 and one NIR image zone 132. The former yields first data; the latter yields second data. The first data may be a watermark payload of 266A08D7B885D. The second data may be a spectroscopy signature that matches with (i.e., indicates) PE plastic. These zones may be positioned as shown, and collectively define a spatial constellation 133 of image zones. (The coordinate systems of the watermark and NIR cameras are fixed in relation to each other by their physical mounting to a stationary, rigid structure, so each point in one image frame can be mapped to a corresponding point in the other image frame—enabling such a combined representation of the watermark and NIR zones and their relative positions.) The orientation of the watermark zone indicates the direction towards the top of the item, i.e., "up" in the bottle frame of reference. (Watermark signal blocks that tile items are conventionally oriented with their two side edges parallel to the central axis of the item, and with their top edges nearest the top of the item.)

The template metadata corresponding to the watermark payload provides constraints that limit the permissible (possible) placements of the constellation 133. That is, the only permitted placements of the constellation 133 are those that are consistent (i.e., do not violate) the item description provided by the template data.

Figure 13:
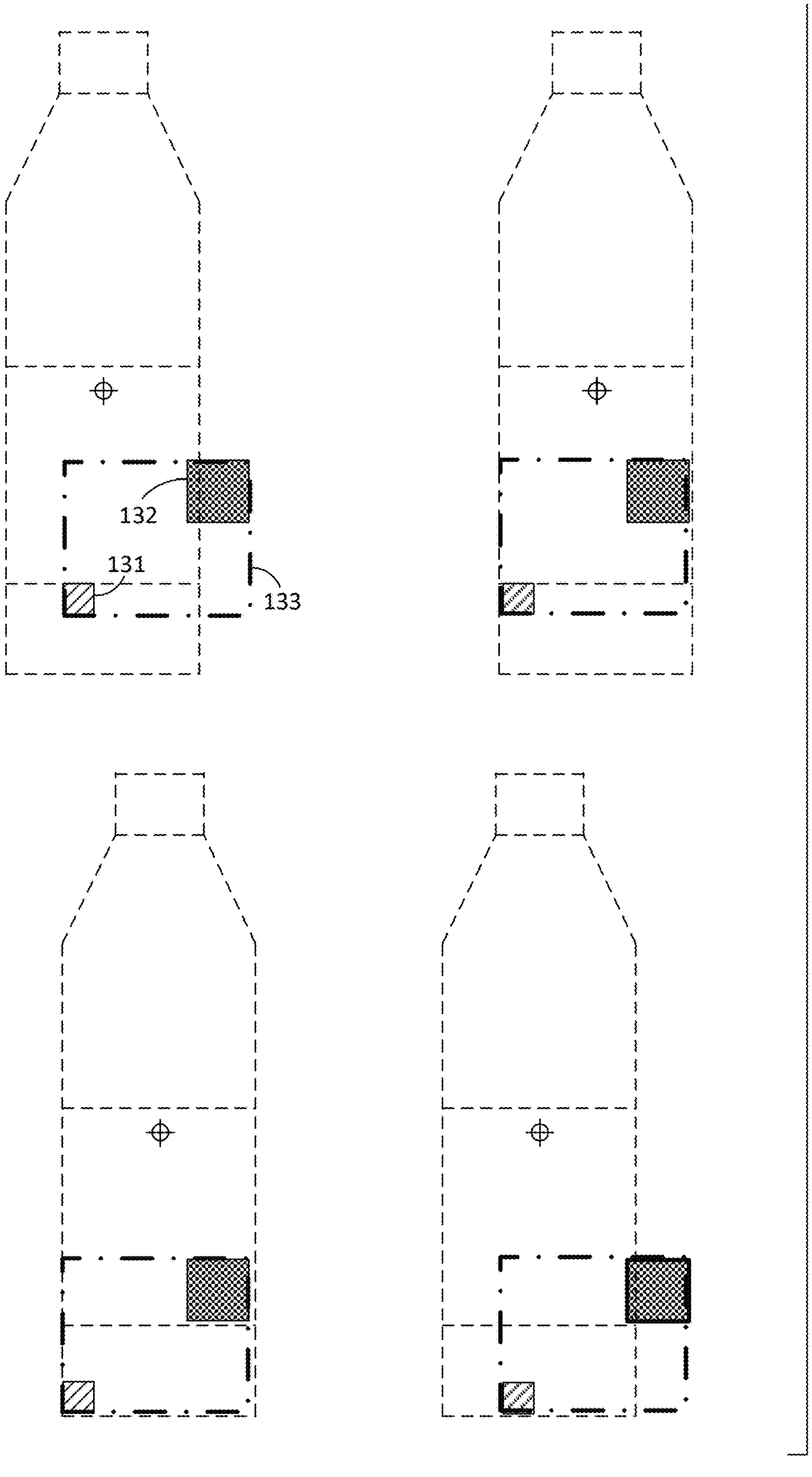
FIG. 13 shows four possible placements of the constellation of FIG. 12 that are consistent with the template data of FIG. 11.

FIG. 13 shows four extrema of possible placements for constellation 133 that are consistent with the template data. In particular they (1) locate the watermark image zone 131 within the watermarked PET region of the bottle; and (2) locate the spectroscopy image zone 132 in the PE region (i.e., the label region). Moreover, each such placement locates the spectroscopy image zone above (i.e., in the "up" direction indicated in FIG. 12) the watermark image zone. (It will be recognized that watermark zone 131 cannot be positioned anywhere above the bottle label, because in that case there is no PE plastic above such position to which the PE spectroscopy image zone 132 can correspond; such positioning of the constellation would not be consistent with the template data.)

In this example of a first approach to ejection targeting using item orientation information and item template information, estimates of the horizontal and vertical placement of the ejection target can be produced from these four constellation placements as follows.

Figure 14A:
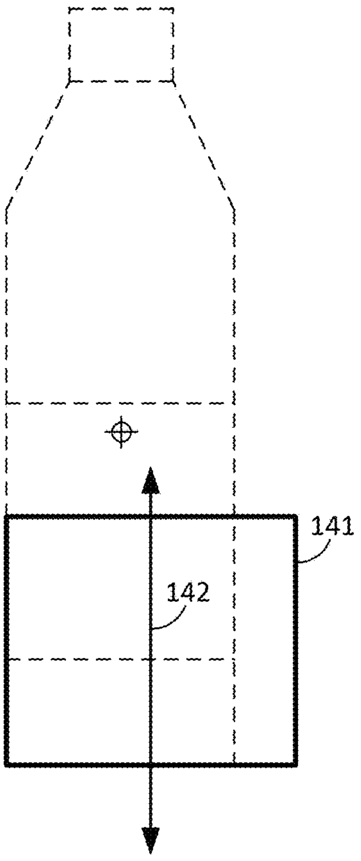
FIG. 14A shows the aggregate area spanned by the four extreme permitted placements of the FIG. 12 constellation in FIG. 13.

First, consider FIG. 14A, which shows the combined area 141 spanned by the four extrema of constellation placements. The horizontal location of the ejection target can be estimated as falling on a line extending vertically through the center of this area, i.e., the double-headed arrow 142.

The vertical location of the ejection target can also be estimated from the extrema of the constellation.

Figure 14B:
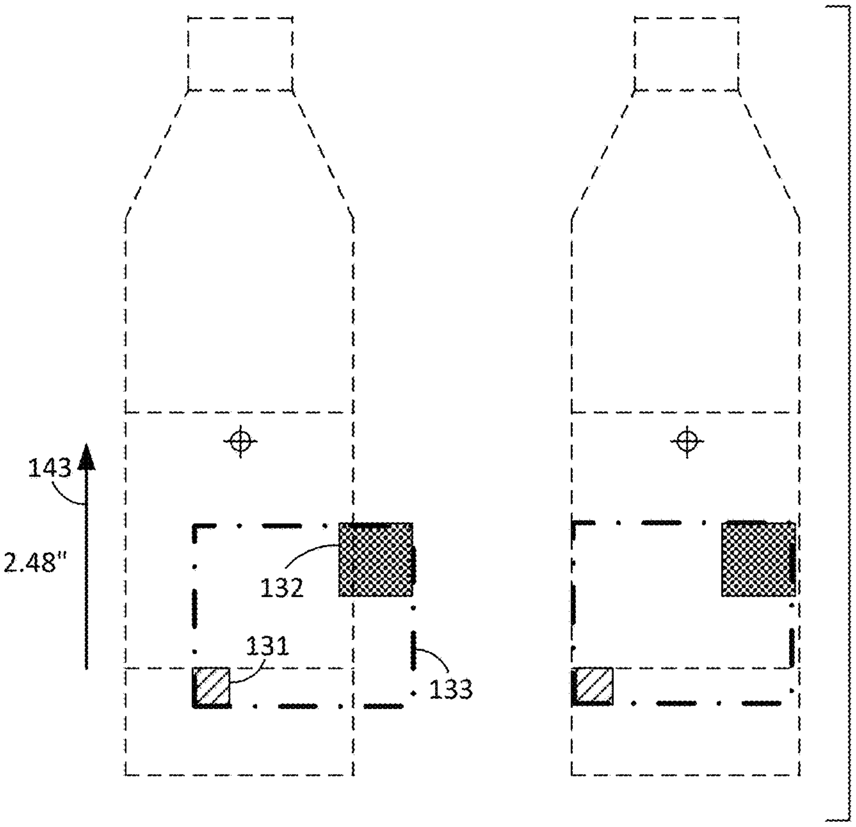
FIG. 14B illustrates that upward placement of the constellation is limited by the constraints that the watermark image zone is preferably located in an area of the template that is watermarked and that the spectroscopy image zone is preferably located in an area of the template that is indicated as polyethylene, and that the only placement enabling both constraints to be met is one that places the watermark image zone in the watermarked area below the bottle label. As a consequence, the watermark image zone is preferably displaced below the desired ejection target by at least 2.48 inches.

Note, from the two constellation extrema shown at the top of FIG. 13 (reproduced as FIG. 14B), that the vertical placement of these constellations is constrained, in the "up" direction by the position of the lower edge of the label area. That is, the constellations cannot be positioned higher within the template data because so-doing would place the watermark zone 131 within the unwatermarked label area. (In contrast, there is no constraint against the spectroscopy image zone 132 from being positioned higher.) Thus, the uppermost placement of the watermark zone indicates one possible location of the lower edge of the label. The metadata detailed above indicates that the desired ejection target is 2.48 inches above the lower edge of the label. Thus, the ejection target is preferably at least 2.48 inches above the top of the upper permitted placement of the watermark image block 131, as shown by arrow 143 in FIG. 14B.

Figure 14C:
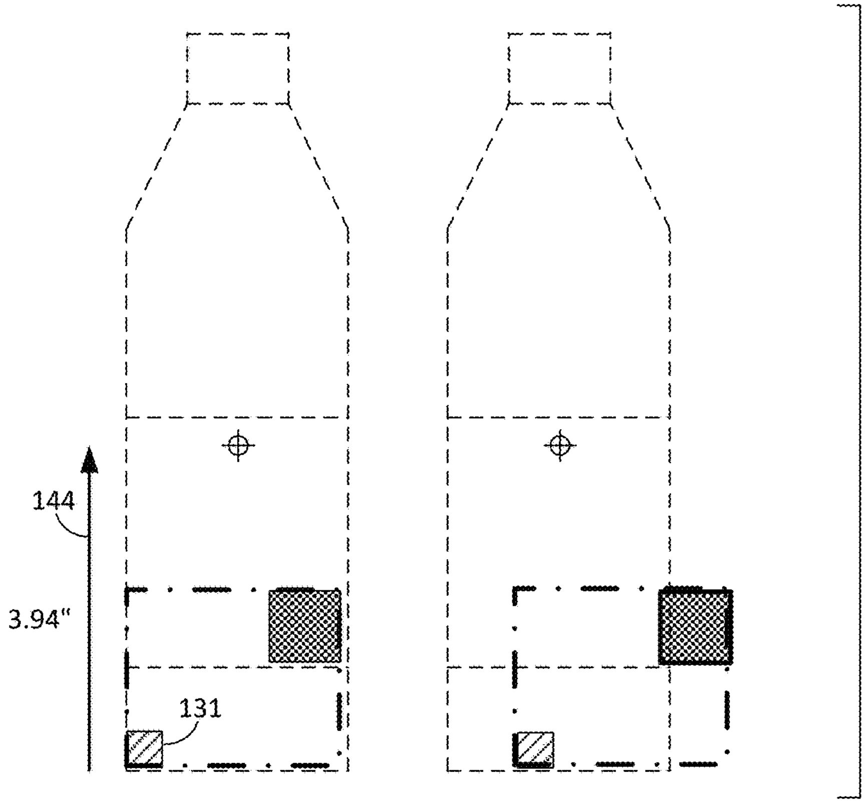
FIG. 14C illustrates that downward placement of the constellation is limited by the constraint that the watermark image zone is preferably within a contour of the bottle as defined by the template data, and cannot be placed to be outside the bottle contour. As a consequence, the watermark image zone is preferably displaced below the desired ejection target by no more than 3.94 inches.

Further note, from the two constellation extrema shown at the bottom of FIG. 13 (reproduced as FIG. 14C), that vertical placement of these constellations is constrained, in the "down" direction, by the position of the base of that bottle. That is, the constellations cannot be positioned lower within the template data because so-doing would place the watermark zone 131 outside the bottle profile. Thus, the lowest placement of the watermark zone 131 indicates one possible location of the base of the bottle. The metadata, detailed above, indicates that the desired ejection target is 3.94 inches above the base of the bottle. Thus, the ejection target is preferably no more than 3.94 inches above the bottom of the lower permitted placement of the watermark image block 131, as shown by arrow 144 in FIG. 14C.

Figure 14D:
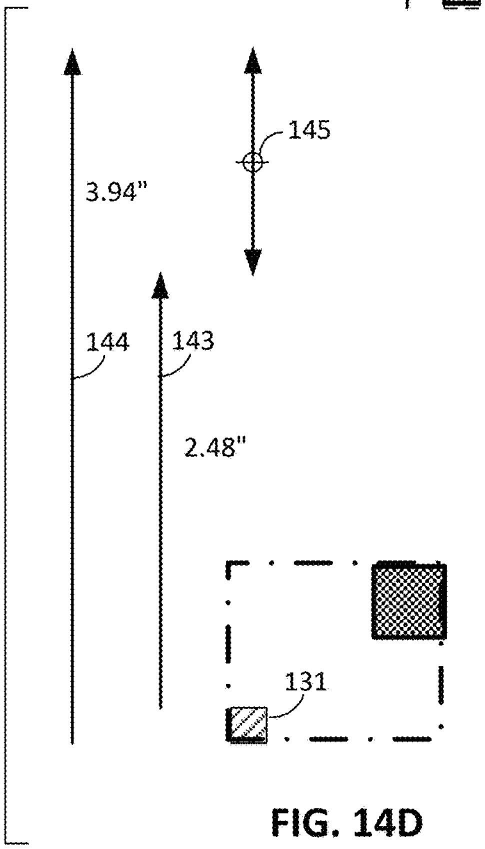
FIG. 14D summarizes the constraints illustrated in FIGS. 14B and 14C, namely that the desired ejection target is preferably within a range of distances above the watermark image zone.

FIG. 14D summarizes this vertical position data. The vertical position of the desired ejection target can be 2.48 inches above the top of the watermark image zone 131 (as denoted by arrow 143) or it can be 3.94 inches above the bottom of the watermark image zone, or it can be anywhere in-between. The mid-point of these two is an estimate of the vertical location of the desired ejection target, as shown by target 145 in FIG. 14D.

Figure 14E:
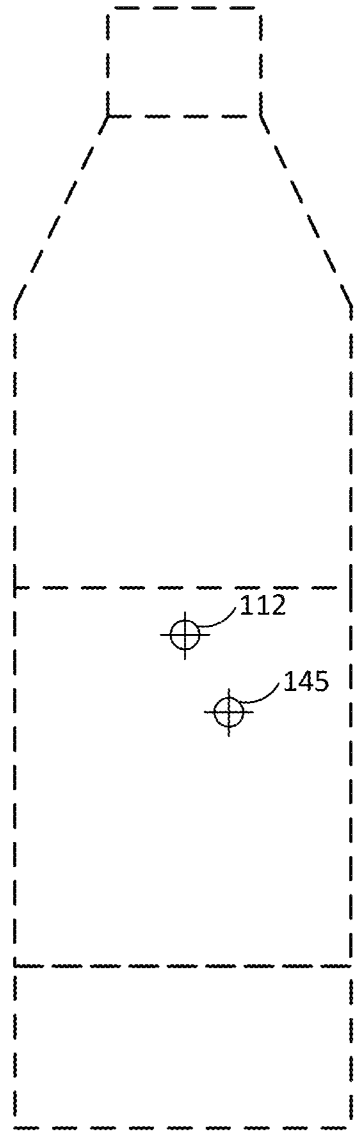
FIG. 14E illustrates the ejection target 145 estimated by the illustrated process, and its proximity to the desired ejection target 112—achieved with attribute data about only two image zones (in conjunction with template data and knowledge of the item frame of reference).

FIG. 14E shows the position of the target 145 estimated by the foregoing procedure, relative to the desired ejection target 112. The difference from the desired target, in this instance, is 0.67 inches—a remarkably small error given the small amount of information on which it is based.

While vertical placement of the constellation is constrained, in the foregoing example, by the watermark image zone abutting boundaries it cannot cross (i.e., the lower edge of the label, and the base of the bottle), in other instances of this first approach it can be the spectroscopy image zone that is the constraining factor—encountering boundaries it cannot cross. Relatedly, while horizontal placement of the constellation is limited, in the foregoing example, by the watermark image zone 131 to the left and by the spectroscopy image zone 132 to the right, in different circumstances such constraints in either direction can be due to either type of image zone.

If additional information is available—such as by the decoding of other watermark-encoded zones that are clumped with zone 131 and share the same payload, or by the identification of additional spectroscopy image zones that are clumped with zone 132 and match the same polyethylene reference signature—the number of constraints on placement of the constellation 133 within the item template increases. With more constraints, the ejection target can be located still more precisely.

Such additional information need not take the form of image zones that are clumped with a watermark image zone and/or a spectroscopy image zone. Disjoint image zones that are consistent, in terms of layout (geometry) and material composition, with the item template data, can similarly serve as constraints. Such an example is shown in FIG. 15.

Figure 15:
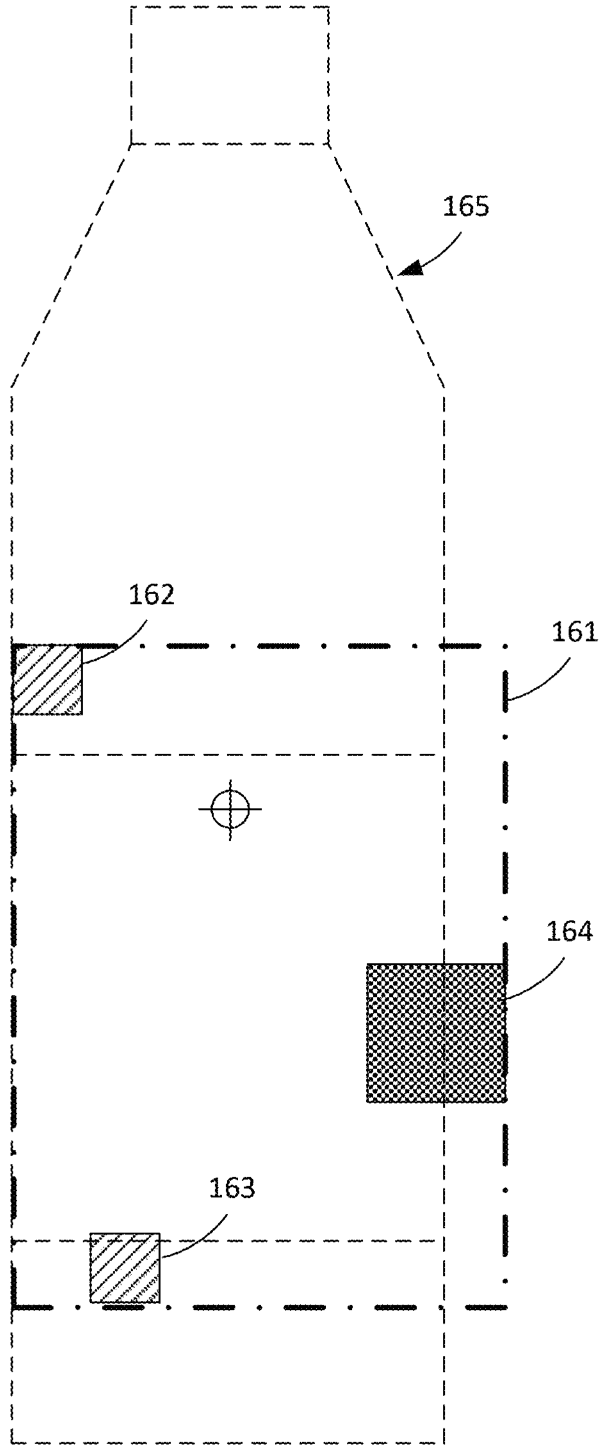
FIG. 15 shows a constellation including two watermark image zones and a single spectroscopy image zone, which collectively serve to further constrain placement of the constellation (and thus the estimated ejection target).

In particular, FIG. 15 shows a permitted placement of a zone constellation 161 that includes three image zones: two watermark image zones 162 and 163, and a spectroscopy image zone 164. As can be appreciated, there is a limited range of placements of the constellation 161 within the item template 165 in which each of image zones 162-164 is placed at a location that is in accordance with the watermark and polyethylene regions indicated by the template data.

Detection of PP (the bottle cap) in a spectroscopy image zone, at a location consistent with the template data, would further constrain the placement of the constellation within the template, and would further refine the estimated position of the ejection target relative to a reference point in the constellation.

Figure 16:
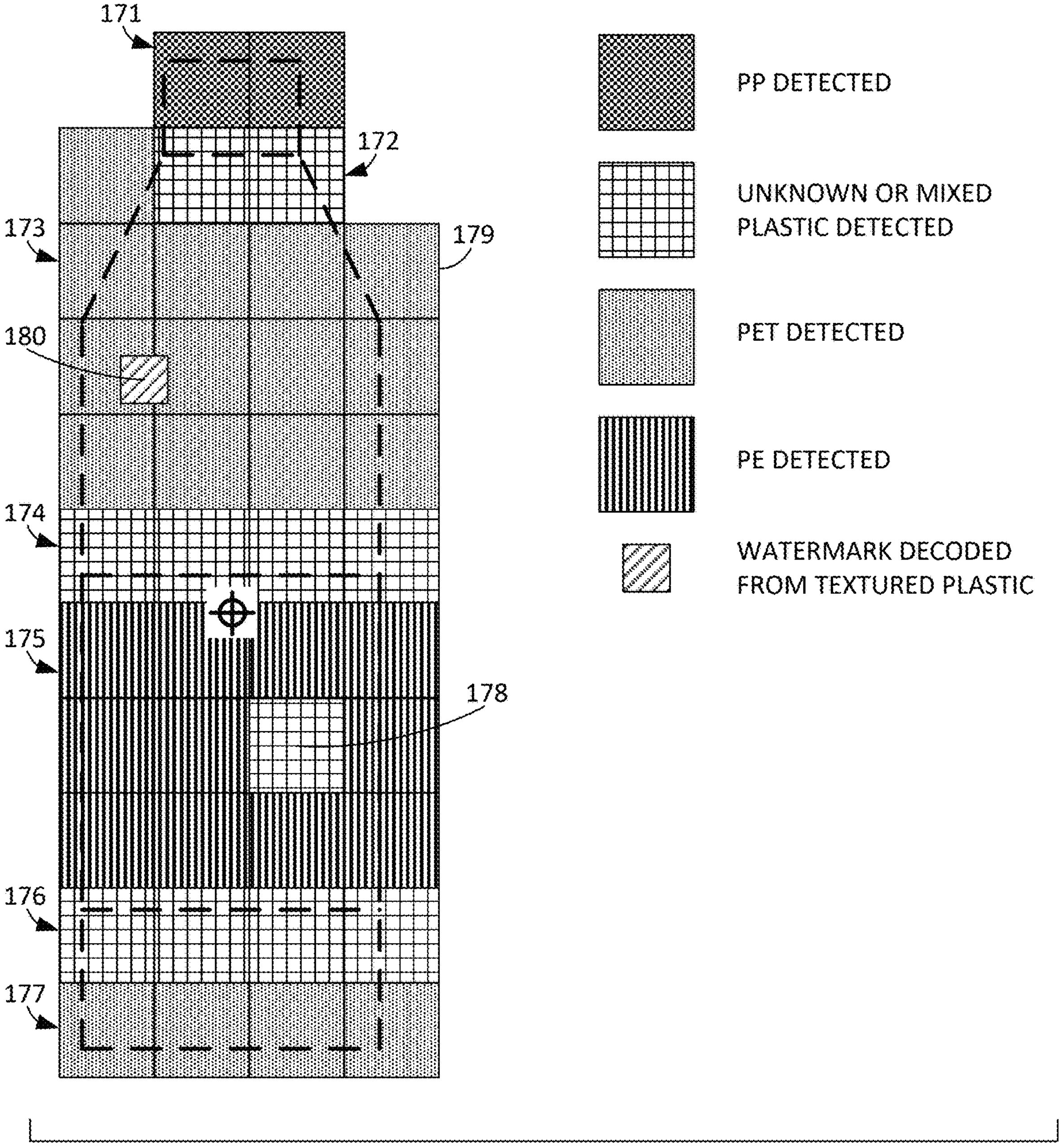
FIG. 16 shows a map of attribute data including multiple spectroscopy image zones (indicating different types of plastic) and a single watermark image zone (which serves to identify the item and establish the item frame of reference).

In the usual case, there is not a single image zone that provides information about the item, but several. FIG. 16 shows an example, in which many spectroscopy image zones provide data about a bottle. A clump of spectroscopy image zones 171 near the top is spectroscopically-identified as PP. Beneath that is a clump of two zones 172 that spans two types of plastic—PP and PET. The camera senses a blend of the two plastic spectra that cannot be matched to any in the spectroscopy system's library of reference signatures, so these zones are identified as unknown or mixed plastic.

A large clump of zones 173 that depicts the bottle above the label is spectroscopically-identified as PET. Beneath that is a band of zones 174 that is again identified as unknown or mixed plastic, because the zones span both the PET bottle substrate and the polyethylene label. Continuing down is a large clump of zones 175 that tiles the label area. These zones are identified as polyethylene. Another band of unknown or mixed zones 176 spans the boundary between the polyethylene label and the PET bottle substrate. At the bottom is a clump 177 identified is PET.

As discussed earlier, some zones cannot be recognized as to their plastic type due to soiling or other phenomenon that causes their reflected NIR spectra not to match any reference signature closely-enough to be identified. Zone 178 in FIG. 16 is of this type.

Some zones encompass only a small area of plastic, yet are identified as to plastic type because the only other subject within such zones is the black conveyor belt, which reflects very little NIR—leaving only the plastic-reflected light to be analyzed for its spectrum. Zone 179 is of this type.

FIG. 16 also shows a single watermark image zone 180 that has been decoded. Its payload is 266A08D7B885D, which corresponds to the Dasani bottle and associated metadata discussed above. This metadata includes data indicating spatial layout and material attributes of the identified Dasani bottle, which serve as constraints by which the desired ejection target location can be estimated.

Figure 17B:
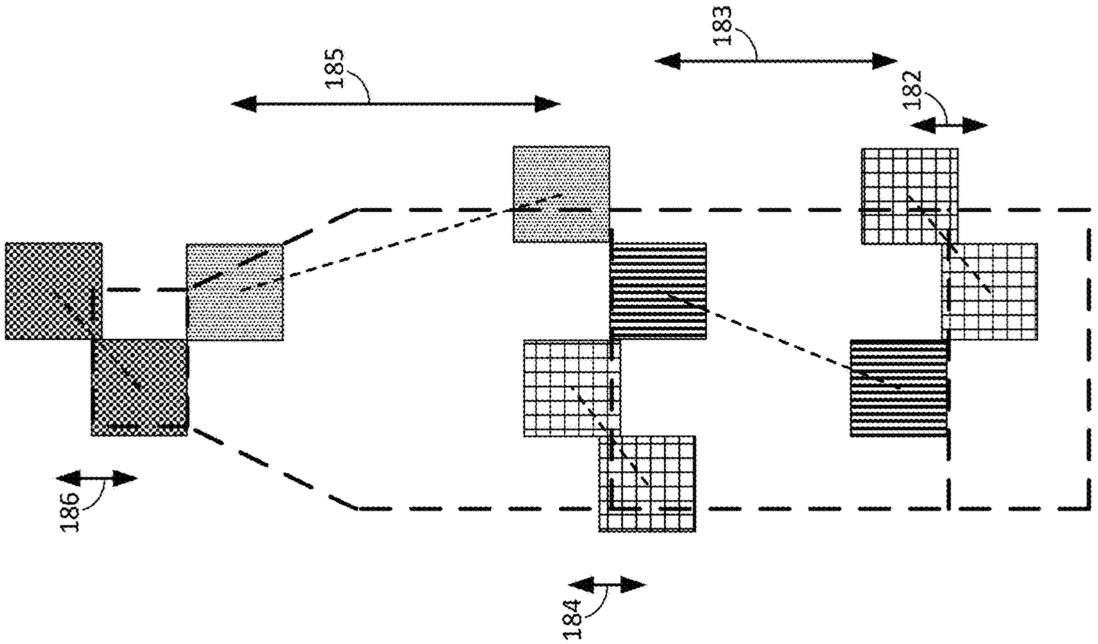
FIG. 17B shows the vertical ranges over which spectroscopy image zones indicating additional plastic attribute data can be placed relative to the bottle template data.
Figure 17A:
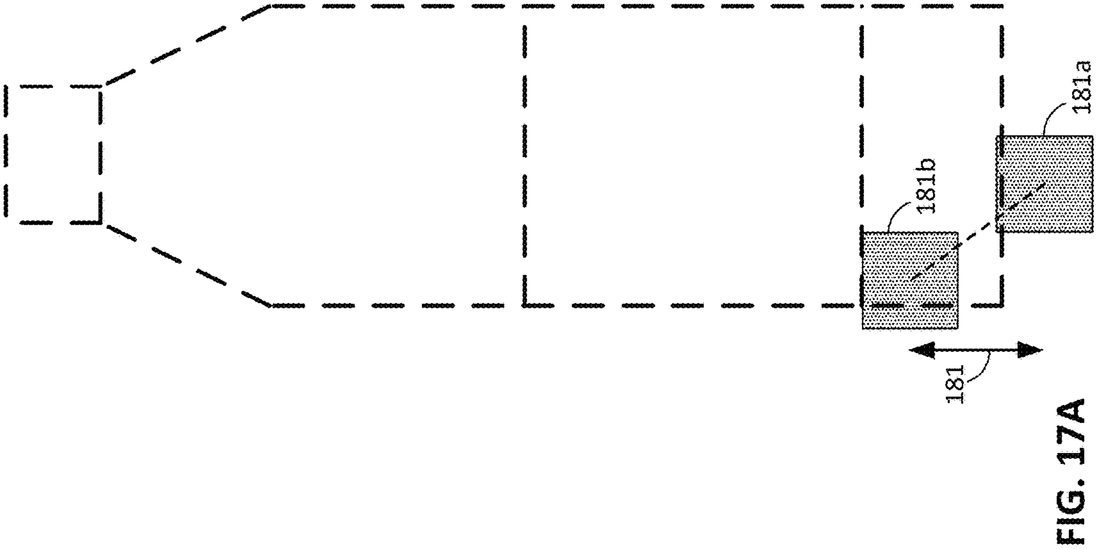
FIG. 17A shows the vertical range over which spectroscopy image zones indicating PET plastic can be placed at the bottom of the bottle template defined by the item template data.

FIGS. 17A and 17B elaborate on how template data serve as constraints on permitted placements of the zones (i.e., the constellation comprising zones 171-177 in FIG. 16). Once a watermark image zone has been decoded (e.g., zone 180 in FIG. 16), the metadata associated with the item is accessed and identifies its layout and material attributes. From this data, the relative positions and the sizes of the different plastic zones can be determined. With knowledge of the size of the spectroscopy image zones on the conveyor, a range of permitted vertical and horizontal locations for each type of plastic of the bottle can be determined. Such locations are determined relative to each other, based on the known "up" direction indicated by indicated orientation of the watermark zone 178.

To illustrate, spectroscopy image zones for PET plastic near the base of the bottle may have their vertical centers within the range 181 shown in FIG. 17A. At the lower extreme (e.g., zone 181*a*), just a small bit of PET is depicted along the top of the zone—the rest being black conveyor belt. At the upper extreme (e.g., zone 181*b*), the zone's top edge comes up to the base of the polyethylene label. (If the zone were placed any higher, it would span PET and polyethylene and thus be identified as mixed or unknown.) A dashed line is shown to establish a visual linkage between the lower and upper extreme vertical placements of zones 181*a*, 181*b*.

(The horizontal placements of zones 181*a* and 181*b* depicted in FIG. 17A are arbitrary; in FIGS. 17A and 17B we are just exploring the vertical constraints of permitted placements of image zones.)

FIG. 17B continues this analysis for other zones. Continuing up the bottle, a row of mixed/unknown spectroscopy image zones may be identified, assuming the zones span the PET/polyethylene border. Their centers are permitted to be vertically placed anywhere in the range identified by arrow 182 (relative to the range 181, below). At the lower extreme, just a bit of polyethylene is encompassed in a zone; at the upper extreme, just a bit of PET is encompassed in a zone.

Spectroscopy zones imaging the label portion of the bottle are permitted with their centers placed at the range of vertical positions indicated by arrow 183, relative to the other ranges. At none of these positions does a zone overlap the PET region below or the PET region below.

Another band of mixed/unknown zones is permitted with the zones' centers in the range 184.

The PET substrate above the label can be identified by spectroscopy zones placed with their centers in the permitted range indicated by arrow 185 (relative to other ranges). Each such placement puts such a zone either wholly within the PET region, or spanning both PET and the black belt.

Above that another band of mixed/unknown zones is permitted (not shown in FIG. 17B for clarity of illustration).

At the top of the bottle, spectroscopy image zones placed with their centers in permitted range 186 can detect the PP of the bottle cap.

It will be recognized that the arrowed ranges 181-186, collectively, impose multiple constraints on vertical placement of the constellation of zones identified by the spectroscopy system, relative to the item template data. Similar ranges can be defined horizontally. Together these ranges tightly constrain possible locations of the desired ejection target.

These ranges are determined from the template information for the Dasani bottle. And this template information is determined from item identification information (which here is provided by watermark information). Without the item identification information, and the metadata to which it enables access, the detailed estimation of the ejection target location by these multiple constraints on placements of the different types of plastic zones could not be so-achieved. And yet only a single watermark zone needs to be decoded to enable such process. (As noted below, means other than watermarking can be employed in other embodiments to determine corresponding item metadata.)

Thus these examples of a first approach to ejection targeting, which use orientation information and item template information, involve estimating a location of the ejection target that is spatially consistent with the location(s) at which one or more particular plastic resins are identified. In these particular examples, the image data includes infrared imagery, and the item orientation information is determined by orientation of a 2D code symbology, e.g., a digital watermark pattern on the item. (In other implementations the item orientation information is determined otherwise, e.g., by neural network analysis of sensed item data.)

A second approach to ejection target estimation, using item orientation information and item template information, involves detecting a label landmark from the imagery (e.g., the top or bottom of the label), and estimating spatial location of the item ejection target using the detected label landmark.

Consider again the illustrative Dasani bottle. From the template data of FIGS. 10 and 11 it can be established that the desired ejection target is near the top of the label, down about 13% from the label's top edge (a label landmark). Once the rectangular label shape on such a bottle is detected (by spectroscopy or otherwise), the ejection target is known to be located at one of two positions: 13% into the label region from one of the label's two short edges-depending on which way the bottle (and label) are oriented in captured image data. The orientation of the watermark signal reveals the "up" orientation of the bottle (and label) and resolves this ambiguity, indicating which of the two short edges of the label is the top edge. Knowing the top edge, the target can be simply located by identifying a position 13% below the label height in the captured imagery.

This particular approach to estimating an ejection target thus involves sensing information about a top or bottom edge of an item label. Then, from stored template information, item orientation information, and stored target metadata, the position of the ejection target can be determined as a distance relative to the top or bottom label edge. (As noted, the horizontal position of the ejection target may be taken as the midpoint of the item's sensed horizontal extent.)

Landmarks other than edges of labels can naturally be used. These include the top and bottom of an item, as well as an item cap. Again, such landmarks can be identified by various means, including spectroscopy, digital watermarking, and neural network analysis.

In the examples given above, the item's central (vertical) axis is aligned with the columns of the watermark and spectroscopy camera image pixels. This is not usually the case. FIG. 18 shows a more typical case, with the item lying on the belt with its central axis at a random angle with respect to the columns of the camera image pixels. Two watermark image zones (191*a*, 191*b*), and three spectroscopy image zones (192*a*, 192*b*, 192*c*) are shown, but zones of each type are tiled across the cameras' fields of view and span the item. When the watermark detector processes zone 191*a*, it determines the affine state of the watermark signal depicted in the zone. This affine state indicates scale, rotation, x-translation and γ-translation of the watermark signal. To decode the payload, the decoder typically re-samples the imagery based on these affine parameters, e.g., using bilinear interpolation, to determine values of the watermark signal at an array of locations corresponding to the originally-encoded locations, i.e., with scale of unity, a rotation of zero degrees, and translations of zero. (The foregoing is detailed more fully in patent documents U.S. Pat. Nos. 6,590,996, 9,959,587 and 10,242,434.)

Figure 18A:
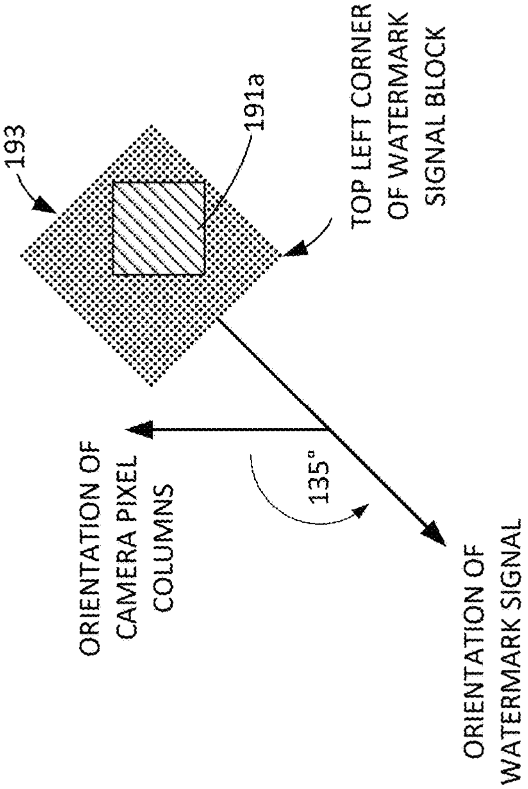
FIG. 18A is an enlargement of a watermark image zone in FIG. 18, illustrating the extent of a full watermark block, and showing the orientation of the watermark signal relative to orientation of the camera pixel columns-thereby identifying the item frame of reference.
Figure 18:
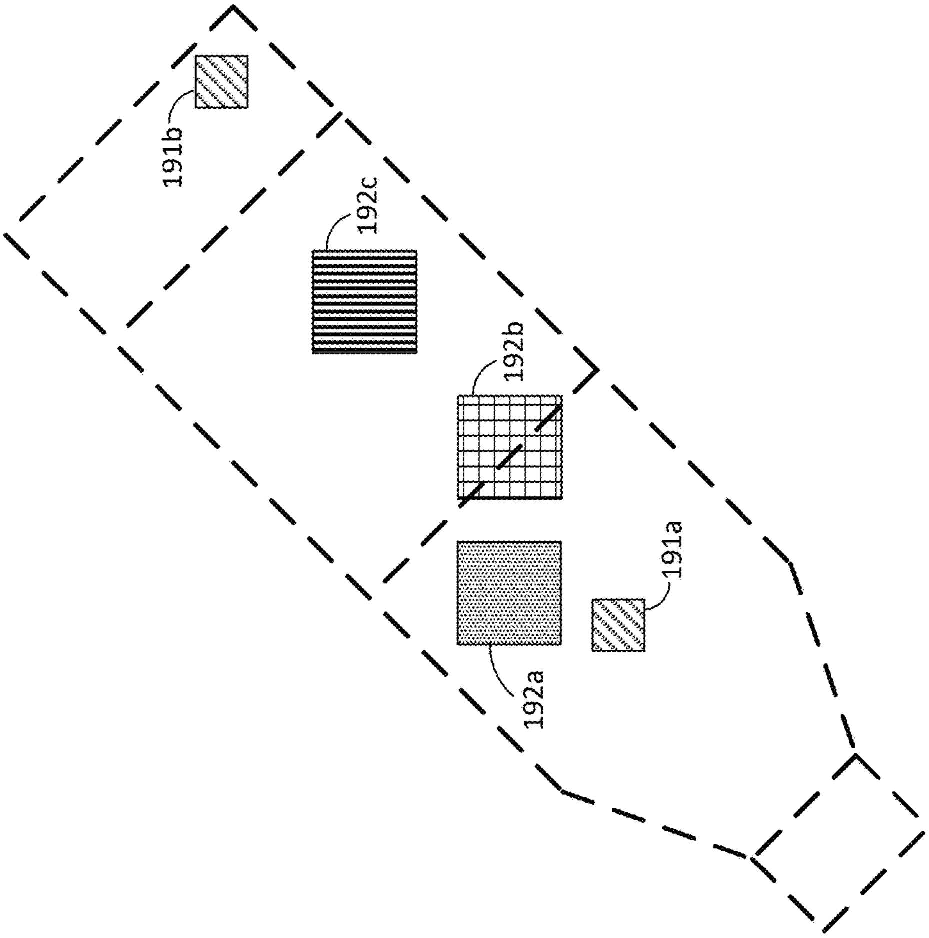
FIG. 18 shows that a waste item on a conveyor is typically imaged, by a camera system, with columns of imagery not parallel to "up" in the item frame of reference.

FIG. 18A shows an enlargement of watermark image zone 191*a*, overlaid on a representation of the watermark signal. In an exemplary embodiment, the watermark signal expresses a 128×128 array of watermark elements ("waxels") that comprise a square signal block. This block is then tiled with other such blocks to cover a desired area. A block of waxels 193 is represented in FIG. 18A as an array of dots. As can be seen, the "top" of the watermark signal block is oriented towards the top of the bottle. In this example, the watermark detector will determine that the orientation of the watermark signal, as depicted in the captured imagery, is at an angle of 135 degrees.

In some arrangements, the metadata indicates one or more regions on the item that lack watermark encoding. The metadata can explicitly define gap or void regions where no watermarking is formed. Alternatively, the metadata can implicitly define such regions by instead explicitly defining regions where watermarking is formed; the gap regions then comprise the regions between and surrounding the regions where watermarking is formed. Metadata specifying an unwatermarked label is such an indication of a region lacking watermark encoding.

Another approach to estimating an item ejection target can employ knowledge of region(s) void of watermark information. This approach can be used even in the absence of other information, such as spectroscopy.

Figure 19D:
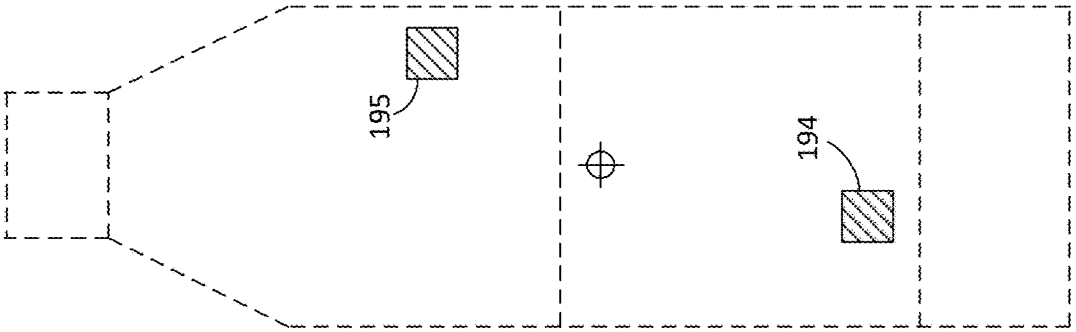
FIGS. 19C and 19D show placements of the FIG. 19A constellation that are not permitted; they are inconsistent with the item template data (i.e., in FIG. 19C, the watermark image zone 195 is placed in the unwatermarked label region, and in FIG. 19D, the watermark image zone 194 is placed in this unwatermarked label region).
Figure 19C:
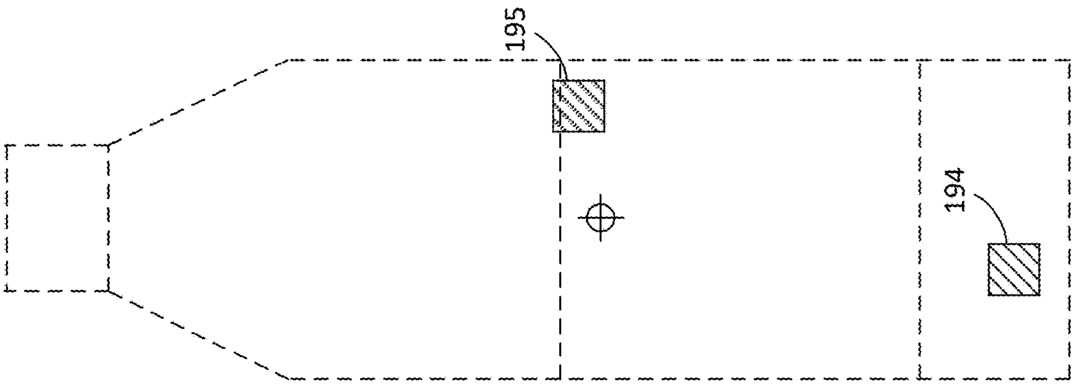
Figure 19B:
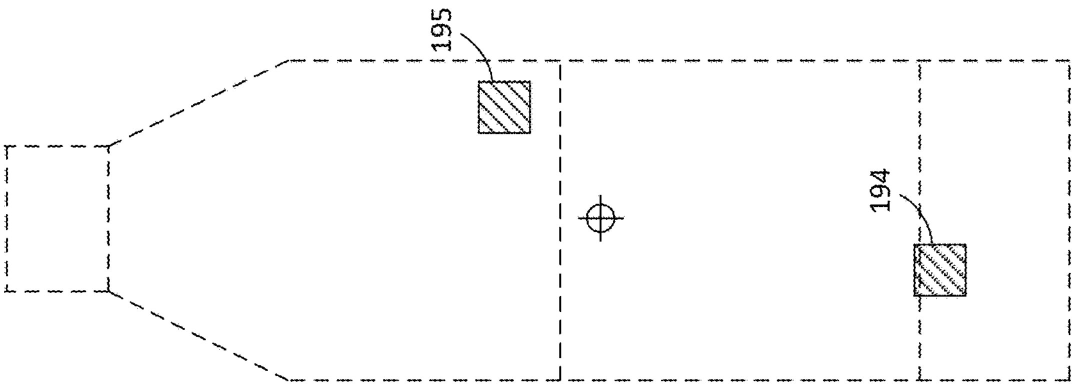
FIG. 19B shows a permitted placement of the FIG. 19A constellation, within constraints imposed by the item template data of FIG. 11.
Figure 19A:
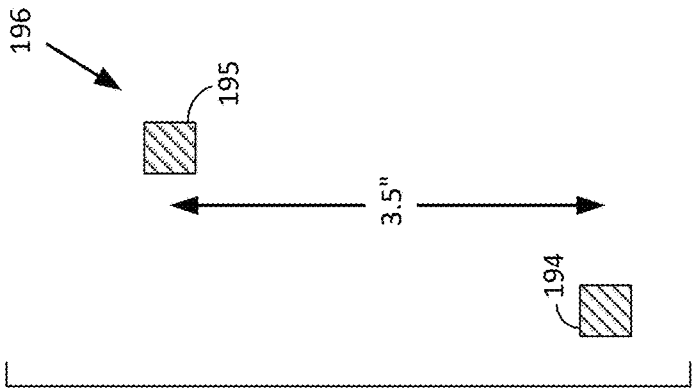
FIG. 19A shows a constellation of two watermark image zones with their centers spaced 3.5 inches.

Referring to FIG. 19A, consider detection of two watermark zones 194, 195 with payloads indicating the Dasani watermark bottle, in the depicted constellation arrangement 196 in which the zones are spaced 3.5 inches apart, vertically, in the item frame of reference. The metadata indicates the label region on the bottle is unwatermarked, and specifies its vertical extent. This unwatermarked region indicated by the metadata constrains possible (permitted) placement of this constellation of zones. For example, while the constellation placement of FIG. 19B is possible, the placements of FIGS. 19C and 19D are not. Often, knowing where a watermark signal is not will substantially constrain the universe of possible placements.

Since the constellation of watermark zones includes a vertical gap of a distance greater than the metadata-specified label height (i.e., 3.5 inches vs. 2.85 inches), and since the only permitted placements of this constellation place zones on opposite sides of the unwatermarked label region, the permitted placements serve to approximately define the extent of the image data occupied by the label. Even a single permitted placement of the constellation (such as FIG. 19B) can provide such an estimate of the label position. From such estimate of the label position, an estimate of the desired ejection target can be made, if the metadata permits identification of the ejection target relative to a feature of the label-such as the top edge. That is, the vertical distance that separates the detected watermark zones can be regarded as an estimate of the label's vertical extent. The ejection target is then located based on this estimate of the label extent, such as a distance "up" from the label bottom, a distance "down" from the label top, or a percentage of the label height from the estimated label top or bottom, e.g., 13%. (The ejection target can be horizontally centered within a bounding rectangle encompassing the detected watermark zones.)

Thus, this approach to estimating an ejection target involves determining the "up" orientation (vertical dimension) of the item, and accessing template data that specifies an unwatermarked region of the item. Sensing provides first item attribute data at a first location (e.g., a decoded watermark payload), and second item attribute data at a second location (e.g., more decoded watermark payload), which collectively comprise a spatial constellation of attribute information. Estimation of the ejection target then involves determining a position of this spatial constellation that is consistent with the template data (here the unwatermarked region of the item).

Figure 20:
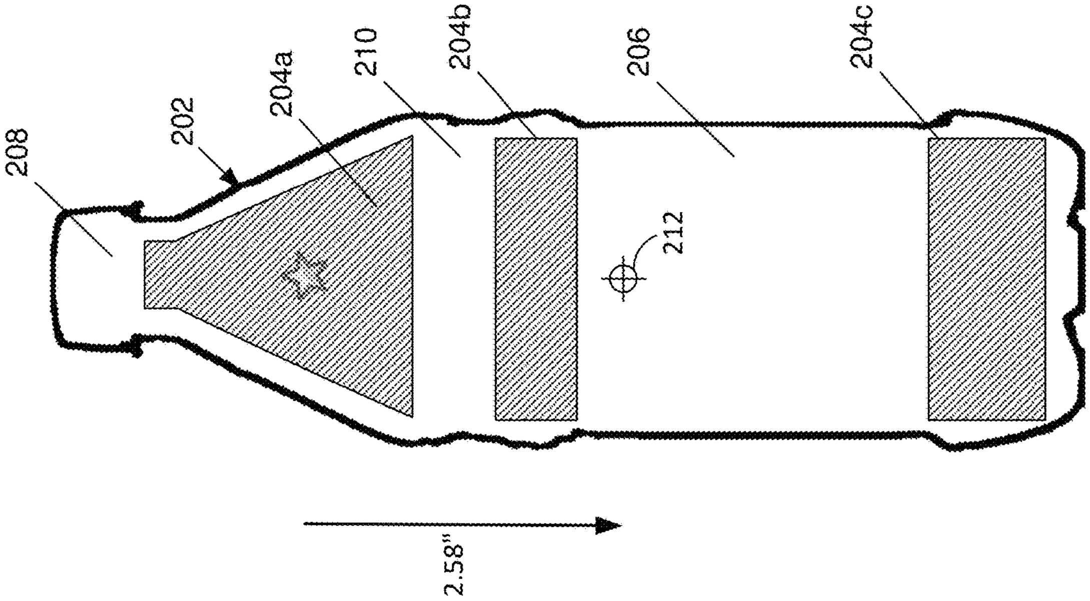
FIG. 20 shows an item template that indicates three disjoint areas of a bottle that are textured to convey a digital watermark signal. The star indicates the centroid of the upper-most of these areas.

In some instances, the template data defines multiple areas in which the watermark signal is present, or absent. FIG. 20 gives an example of the former case, but the latter case is straightforward to understand from the following description.

In FIG. 20, template data indicates that plastic texture watermark data appears in three areas 204*a*, 204*b* and 204*c*. This bottle has a gap (or void) 206 where an unwatermarked label overlies the plastic, and a gap 208 at the top where the unwatermarked cap is found. It also includes a gap 210 in a ring around the body where a decorative jungle motif is visibly textured into the body. Finally, there are gaps near the edges of the bottle where the bottle's extreme curvature will interfere with watermark reading. The template information can further include information indicating placement of the desired ejection point 212 relative to a feature of one or more of the template areas, such as the top edge of gap 206 or the bottom edge of area 204*b* (i.e., the top of the label).

Figure 21:
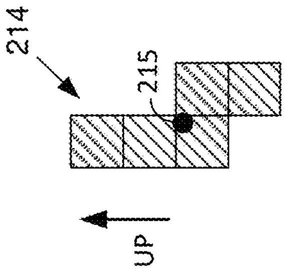
FIG. 21 shows a clump of five watermark image zones, defining a constellation, with the centroid of the clump indicated by the black dot.

Referring to FIG. 21, imagine that a constellation (pattern) 214 of watermarked image zones is detected in captured imagery, and their decoded payloads indicate these zones are imaged from a water bottle as described above. The template data of FIG. 20 is accessed from a stored metadata structure, and it is found that this constellation of zones can only fit in the top watermarked area 204*a* of the template, because this is the only watermarked region whose vertical extent is sufficient to accommodate the height of the constellation. Moreover, there is only a limited range of candidate placements within area 204*a* at which the constellation 214 can fit (i.e., template-permitted placements).

Figure 23:
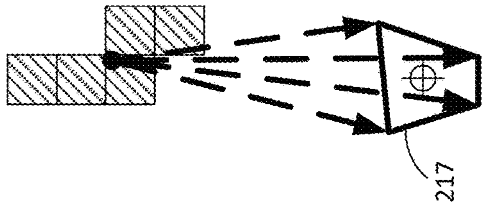
FIG. 23 shows how vectors derived from the constellation placements of FIG. 22 can be combined to define a region in which an ejection target is constrained.
Figure 22:
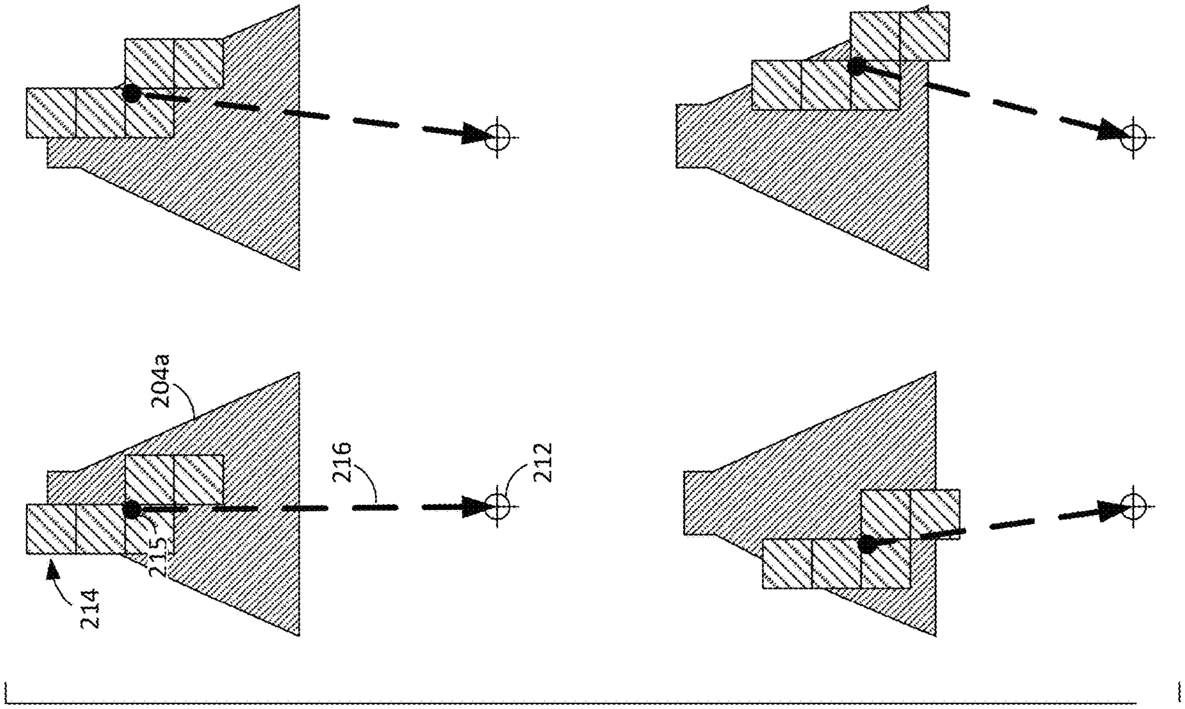
FIG. 22 shows four extrema locations by which the constellation of FIG. 21 can be placed in the upper-most watermarked area of FIG. 20.

In this approach to estimation of the ejection target, the limits (extrema) of these allowable placements are determined. (The center of each watermarked zone should fall within the watermarked region indicated by the template, in this example). The four (in this case) extreme placements are shown in FIG. 22. A vector 216 is defined, for each placement, between a reference point in the constellation (here a center point 215, although any point could be used) and the template-indicated desired ejection point 212. These four vectors describe the most extreme possible positions of the ejection target. As shown in FIG. 23, these vectors define a polygon 217 within which the ejection target is preferably located. The center of this polygon is used as the ejection target to divert the bottle from the belt.

In other approaches, the pattern of decoded watermark zones is fit to the templated watermark area by methods other than those just-detailed. In a particular approach, a constellation of decoded watermark zones is placed within the templated watermark area so as to maximize a fit metric, which improves as the pattern is positioned more centrally in the templated area.

Figure 24B:
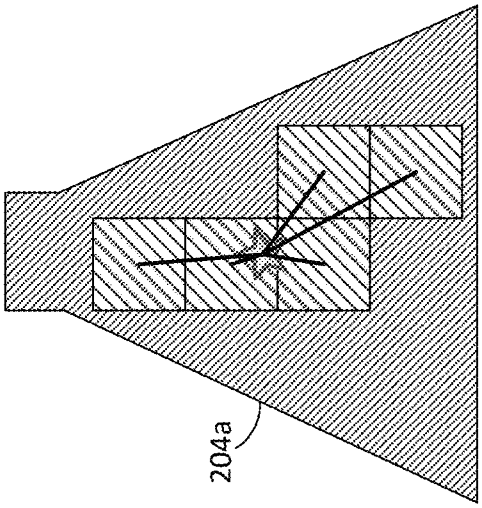
FIGS. 24A and 24B show a different approach to estimating location of an ejection target, based on trying different placements of the constellation to optimize a metric.
Figure 24A:
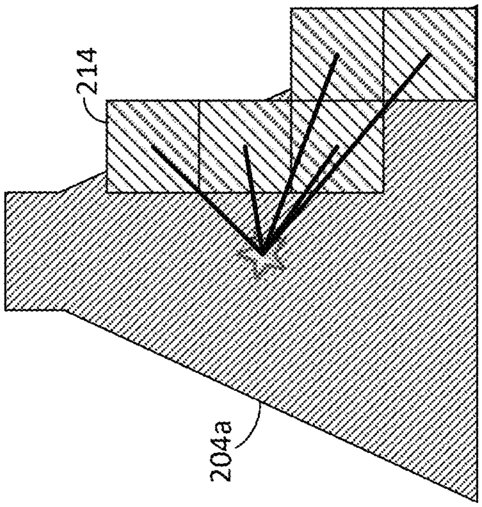

An illustrative fit metric is described with reference to FIGS. 24A and 24B. An initial placement of the constellation 214 relative to templated watermark area 204*a* (the only such area in which the constellation will fit) is trialed, is shown in FIG. 24A. A metric is computed as the sum, across all decoded watermark zones in the constellation, of the squared distance between the zone center and the centroid of the templated watermark area 204*a* in which it is placed (shown by the star). The pattern 214 in FIG. 24A comprises five zones, so there are five distances—shown by the five lines. The pattern placement is then adjusted a few pixels to the right to see if the metric decreases. If not, it is moved to the left instead—to see if the metric decreases. Such horizontal adjustments are alternated with vertical adjustments, in iterative fashion, until a minimum in the metric is found. Such a position is shown in FIG. 24B. At this point, the centroid of the constellation 214 (shown by the black dot 215) most nearly coincides with the centroid of the watermarked area 204*a*.

Figure 25:
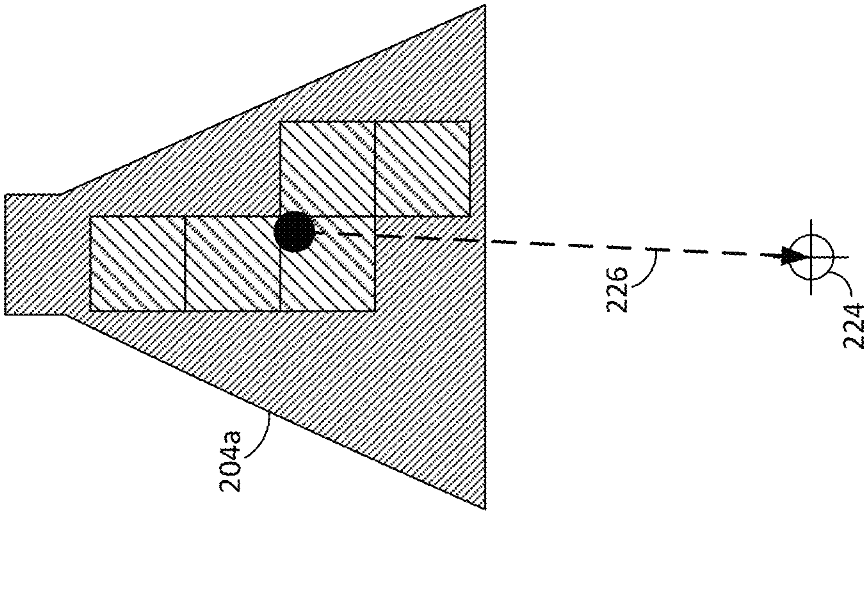
FIG. 25 shows how an ejection target 224 can be estimated based on placement of the constellation that yields a best metric.

The template data includes data indicating the location of the desired ejection target 224 relative to the centroid of the watermarked area 204*a*. In this example the location may be 2.58 inches vertically downward, as indicated in FIG. 20. So once a final placement of the pattern 214 of decoded zones relative to the templated watermark area is established, then an estimate of the ejection target can be located relative to the centroid 215 of this pattern, as shown by the vector 226 in FIG. 25. (As in in most cases, the desired ejection target is not located precisely by this approach, since the actual placement of the constellation 214 relative to the watermarked area 204*a* is not precisely known; its depiction in FIG. 25 is just a suitable approximation.)

The sum-of-squared-distances fit metric detailed above is just one of multiple metrics that can be used. Another is the vector sum of vectors from the centroid of area 204*a* to the center of each watermark zone in the constellation 214. Many other possible metrics will be evident to the artisan.

From the examples just-given, it can be seen that use of template data—and placement of a pattern of image zones (item attributes) within this template data—enables an ejection target to be established that is within a small distance of the metadata-indicated preferred ejection target. In a prophetic example, the targeting error is usually less than 96 pixels (e.g., 0.64 inches), is typically less than 48 image pixels (as in FIG. 23, e.g., 0.32 inches), and is frequently less than 24 pixels (e.g., 0.16 inches). Yet this result is achieved despite use of only a few decoded watermark image zones. If data is available for more image zones, fewer possible placements of the resultant pattern are permitted, thereby further narrowing the range of possible ejection target placements.

Figure 26:
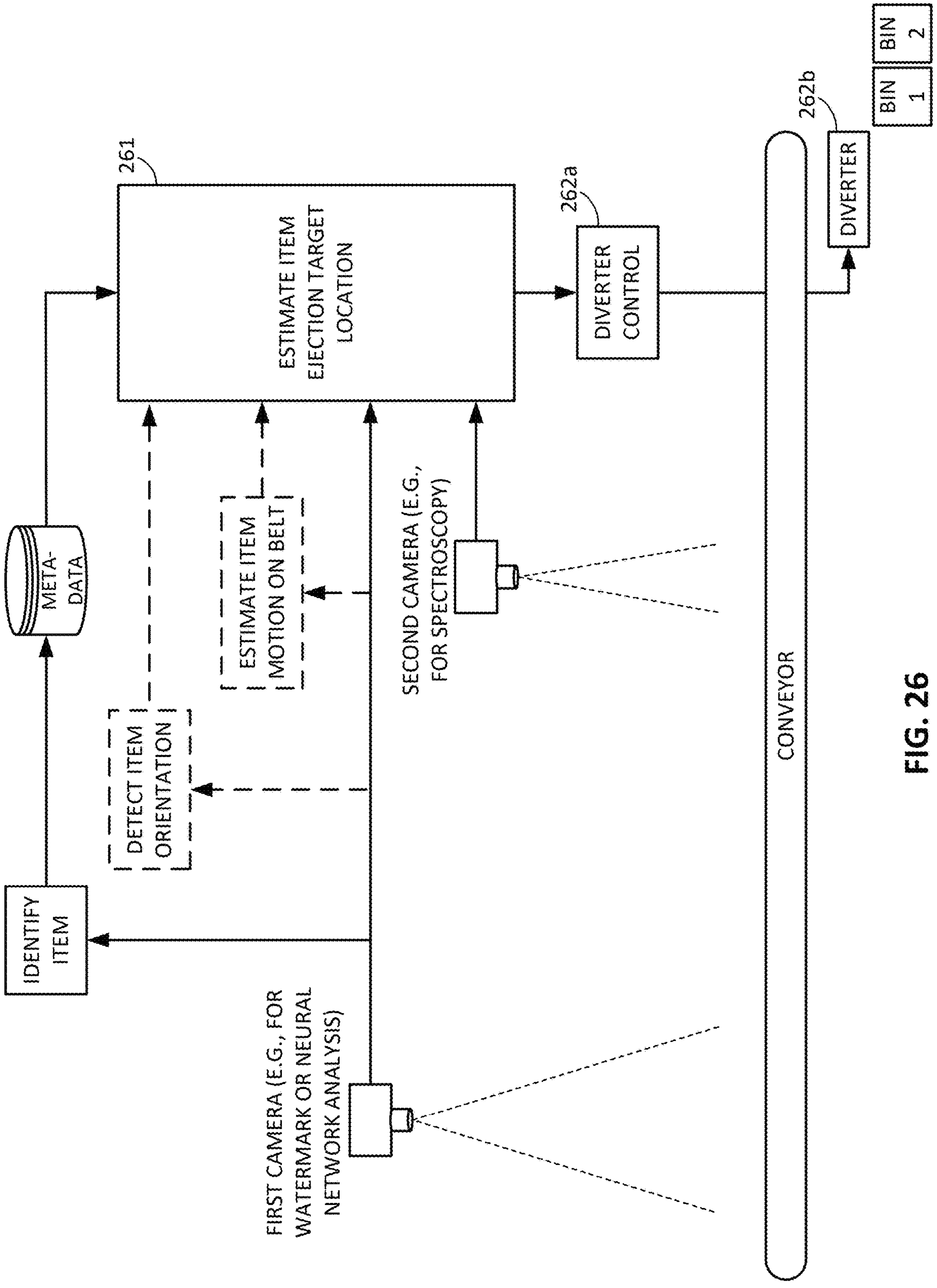
FIG. 26 depicts one illustrative implementation incorporating aspects of the present technology.

FIG. 26 shows one illustrative implementation that incorporates aspects of the present technology. Among the depicted components are (a) a processor 261 configured to obtain stored metadata about the item based on the determined item identification information, and to estimate spatial location of an item ejection target using the sensed item data and the stored metadata; and (b) a diversion apparatus 262*a*, 262*b* controlled in accordance with the estimated spatial location of the item ejection target, to divert the item from the conveyor to a destination (e.g., Bin 2). This arrangement employs two cameras: a first for collecting visible light imagery for item identification, and a second for collecting, e.g., infrared reflection spectra from the item for plastic identification. (An associated NIR light source is not shown.)

Concluding Remarks

Having described and illustrated the technology with reference to exemplary implementations, it will be recognized that the technology is not so limited.

For example, while most of the detailed implementations determine identification information for a waste item by detecting and decoding (i.e., reading) watermark-encoded information formed on the item, this is not necessary. Nor is it necessary to employ the watermark information to discern the “up” direction in the item frame of reference. Other processing techniques can be applied to image data to determine such information.

One such technique is image recognition by machine learning, such as a neural network. A convolutional neural network can be trained, e.g., using multiple labeled training images of known items, in conjunction with reverse gradient descent methods, to configure network weights and parameters so that imagery of an item generates a corresponding response from a fully-connected classifier stage. This response can indicate the identity of the item, enabling access to an associated store of metadata. Similarly, the network can be trained to identify the “up” direction of the item. Further information on neural networks and their training is found in U.S. Pat. No. 10,664,722, and can be employed in the present application.

Another such technique for determining identification and “up” information for a waste item is image recognition using fingerprint data, such as SIFT, SURF, ORB or FAST keypoints (further detailed below). Images depicting known items are processed to extract keypoint data, which is stored in a reference library for later use. When keypoints are later derived from imagery depicting an unknown item, those keypoints are compared against the keypoints earlier-stored in the reference library, to determine whether a match can be found, thereby identifying the unknown item. The orientation state of each keypoint (or a constellation of keypoints) establishes the “up” direction.

Still further, optical character recognition (OCR) can be used to determine identification and “up” information for a waste item (the latter information being indicated by orientation of the text). Linear and 2D barcodes (including QR codes) can similarly be used to determine “up” information for an item, and to identify the item.

Figure 27:
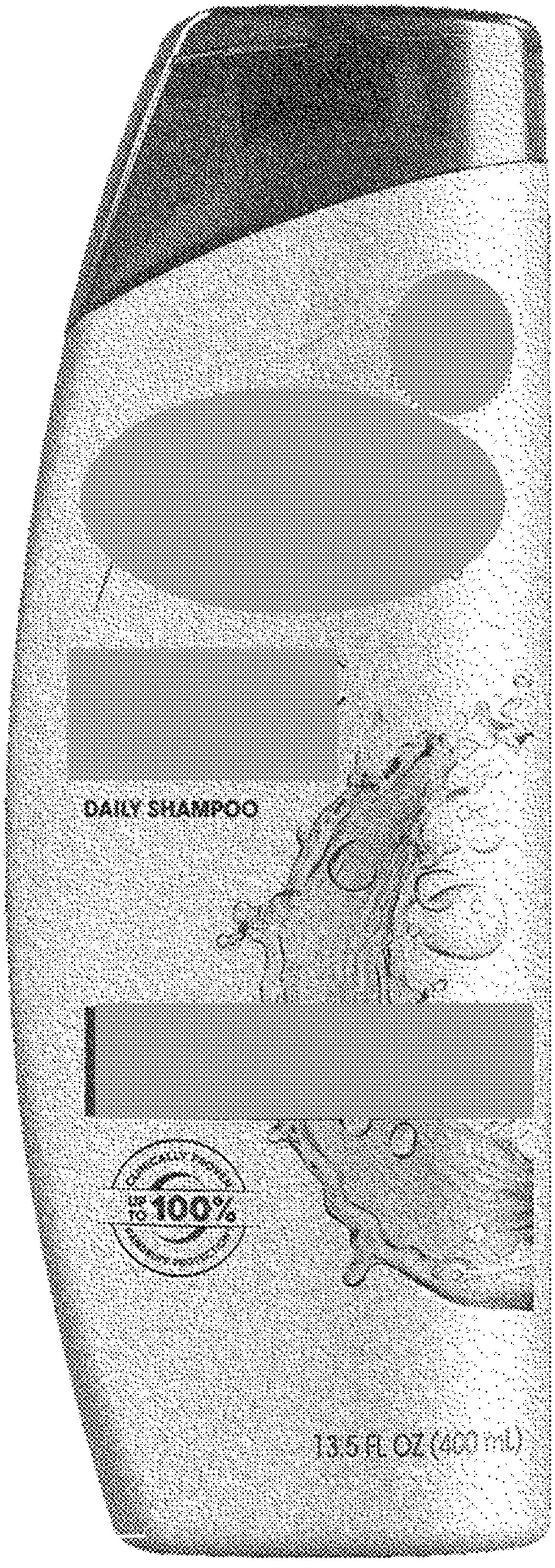
FIG. 27 shows a consumer packaged good that, after disposal, may appear as a waste item on a conveyor, which can be identified (and for which an item frame of reference can be established) by digital watermarking, artificial intelligence (e.g., using deep learning), optical character recognition, and/or image fingerprinting.

FIG. 27 shows a shampoo container that can be recognized by any of the foregoing techniques.

(Although reference is repeatedly made to determining an “up” direction, this is not essential. Rather, “up” is a specific case of a more general operation-establishing an orientation frame of reference for the item. This can be done otherwise, such as determining a “down” direction for the item, etc. Metadata for an item is typically defined in the same orientation frame of reference as is discerned from the image data, e.g., by reference to the “up” direction for the item. However, this is not required, and appropriate translation can be employed to determine consistency of item metadata with attributes of item image zones, if same are defined with different frames of reference.)

The identification information produced by each of the above-noted techniques can be used to obtain metadata corresponding to the identified item, e.g., by accessing a database that is indexed by the identification information. This metadata can include information of the types earlier detailed. For example, this metadata can indicate that the identified item originally comprised a body portion of a first plastic (e.g., PET), and a second portion of a second, different plastic (e.g., a label of polyethylene). In some embodiments such metadata includes template data indicating areas of the item, and associated attributes-such as plastic type, and/or presence (or absence) of watermarking. The template data can define such areas relative to boundaries of the item (e.g., its top, bottom, or sides), and/or such areas can be defined relative to other areas (e.g., the bottom of a PP cap is originally spaced 3.55 inches vertically upwards from the top of a PE label). An ejection target can be defined by reference to any such item landmarks.

Reference in the above paragraph to “originally” acknowledges that the item configuration may have been changed before it is imaged on the waste conveyor. For example, the item may have been dented or crumpled. Allowance for such physical distortion can be made in applying the processing principles discussed herein, e.g., by use of empirically determined factors by which attributes of an item on the conveyor belt may differ from attributes of the item in its original form.

Thus, it should be understood that operations in the embodiments above that are performed using watermark information can alternatively be performed using other techniques, such as using information provided by neural networks, optical character recognition, 1D and 2D barcodes, keypoints, fluorescence and tracers as described earlier, etc.

Similarly, while NIR spectroscopy is employed in certain detailed embodiments, others of the just-noted technologies can be substituted. For example, a label area on a bottle can be recognized and segmented by use of a trained neural network, or by image fingerprinting. Similarly, a plastic resin at a location may be discerned by using a neural network to identify an item, and then employing the item identification to access stored item metadata that details item attributes.

Although the sensors in the illustrated embodiments are all cameras, other types of sensors can be used along the conveyor line to collect information used in determining item identification information and/or item orientation information. One such example is an RFID reader, since RFID chips are attached to some waste items. Another is a laser range-finder to determine, e.g., the height of an item, which can be a clue to item identity.

While several different approaches to discerning different types of information are detailed, it will be understood that these approaches are not mutually exclusive. Some embodiments employ two or more of these approaches, jointly or alternatively.

For example, two approaches may be employed jointly to serve as a check on each other. If, for instance, NIR spectroscopy identifies an item as being composed of one type of plastic resin, and metadata accessed based on a watermark- or neural network-based item identification identifies the item as being composed of a second type of plastic resin, then creating both data allows the discrepancy to be identified and corresponding action to be taken (e.g., do not eject the item, or resolve the conflict by stored rules).

Two approaches may also be employed alternatively. For example, item identification may commonly proceed using watermark technology. But a convolutional neural network system may be present to provide a backup item identification, in case an item does not carry watermark information, or such information is unreadable.

A targeting approach detailed above that employs extrema of constellation placements uses four extrema (e.g., FIGS. 13 and 22). However, in the usual case in which the permitted range of placements spans a rectangular area (e.g., area 141 in FIG. 14A), then only two extrema may be used. For example, the upper left and the lower right possible placements of the image zones are sufficient to define the extent of the permitted rectangular area. (And, as noted, an ejection target estimate can be established based on just one permitted placement of a zone constellation-without use of extrema.)

It will be understood that template metadata defining areas of particular attributes (e.g., having or lacking watermark signal, such as area 204*a* in FIG. 20) can employ a sequence of {x,y} coordinate points that define lines comprising the boundary of such areas.

While a fit metric detailed above is improved by minimization, it will be recognized that other fit metrics can be optimized by maximization.

It will be understood that estimating the location of the ejection target for the item typically results in a location, within the image data, to which an ejection operation is to be applied. The item depicted by the image data is normally advanced linearly, by conveyor belt movement, to an end of the conveyor, or to other location along the conveyor at which the ejection operation is applied. Similarly, the location of the ejection target is advanced linearly in step with the belt movement. Knowing the speed of belt movement, and its linear translation, the ejection target defined in captured imagery is translated to an advancing belt position, and operation of the ejection mechanism is targeted and timed to operate on the estimated location of the ejection target on the item. (That is, each pixel in imagery captured by the watermark-reading camera(s) can be mapped to a specific location on the belt. With its knowledge of the belt speed, the ejection system can determine what time it should activate an air-jet to target a particular item depicted in the imagery.)

Sometimes, however, the item does not advance with the belt. Sometimes the item moves independently of the belt, such as by tumbling or rolling (hereafter "rolling"). In such case, the estimated ejection target location needs to be moved correspondingly. Patent document US20210299706 teaches that the speed of rolling can be sensed from frames of imagery, and corresponding adjustments can be made to ejection targeting.

Applicant has discovered that it is not enough to sense the speed of item rolling on the conveyor. Instead, applicant has found that accurate ejection targeting requires determining the acceleration of the item, i.e., the rate at which the rolling speed is changing. This is accomplished by sensing the item speed, relative to the belt, between two or more different pairs of locations.

In an illustrative implementation, a camera that gathers imagery for watermark or neural network analysis is used to sense item movement on the belt. Such camera may have a field of view that spans about 15 cm of the belt in its direction of travel. If the belt is traveling 3 meters per second, and the camera captures imagery at a rate of 300 per second, then a new image frame is captured for each 1 cm advance of the belt. A given location on the item is thus depicted in each of 15 image frames in a sequence. Feature tracking can be employed to track the movement of item features from frame to frame. The speed at which item features move between frames can thus be determined, and compared to the belt speed.

Item feature points newly-entering the camera field of view can be identified in a first frame. Then, for each identified feature point, a first speed can be determined based on feature movement between the second and fifth frames of a sequence of 15. A second speed can be determined based on feature movement between the sixth and ninth frames. A third speed can be determined based on feature movement between the tenth and thirteenth frames. From any pairing of these three speeds, or from all three of these speeds, the time-rate-of-change of the feature speed relative to the belt can be discerned. Acceleration values may thus be computed for multiple feature points on an item. These values may be averaged to yield a net acceleration value for the item. The last of the speed measurements for multiple feature points on an item can similarly be averaged to yield a last-known speed for the item. Such item acceleration and last-known speed can then be used to predict the movement of the item, relative to the belt, that will occur before the item reaches the diverter (e.g. air-jet) station along the belt. The ejection targeting is then adjusted to compensate for such item movement.

(Naturally, the particular frame numbers cited in the just-given example are illustrative only. If speeds are sensed from three or more different pairings of image frames, curve-fitting can be employed to refine an estimate of acceleration- and optionally to estimate higher order dynamics of movement. The feature points tracked from frame to frame can be of any convenient type. Harris corner points are an example, since they are simple and fast to identify. ORB and FAST keypoints can likewise be employed. Desirably, multiple keypoints are sensed on each item, in case certain keypoints are not detected in certain frames. In some embodiments, another camera is used for acceleration estimation, e.g., viewing a portion of belt between the watermark-reading station and the ejection station. Such additional camera can be of lower resolution than the camera(s) used for watermark detection, since the imagery needn't be as finely-detailed in order to determine the time-rate-of-change of the item speed as its rolling slows.)

In an illustrative arrangement, the ejection target is estimated within a frame of reference that is based on conveyor coordinates, e.g., with an actuation force controlled to occur at {x,y} coordinates defined by a first coordinate in the conveyor's direction of travel dimension, and a second coordinate in the conveyor's width dimension (i.e., perpendicular to the conveyor direction of travel). It is these {x,y} conveyor coordinates that are adjusted, in accordance with the detected item acceleration, to ensure that the actuation force is applied where the item will be when it reaches the diverter.

While item metadata is used in many embodiments to target the location to which an ejection force is to be applied, item metadata can also be used to control the magnitude and/or duration of the ejection force. For example, the metadata for an item can indicate the item's weight, or density. A solenoid-operated valve that controls application compressed air to an ejection nozzle can be opened for a longer or shorter interval in accordance with the item's weight or density. For heavier or denser items, a longer duration air-jet can be appropriate; for lighter or less-dense items, a shorter air-jet interval can be used.

Item metadata can also be used to determine which items are ejected. For example, if a particular beverage producer is willing to pay a premium price for recyclate produced only from its own bottles, then the system operator can configure the sortation system so that only bottles of that producer are selected for ejection, based on metadata-indicated brand information. A batch of recyclate can then be sourced solely from that producer's bottles. Other bottles—even of the same plastic resin—can be left un-diverted on the conveyor.

A load of incoming waste may be sorted in multiple passes, with a first pass separating-out Coke bottles, a second pass separating-out Pepsi bottles, a third pass separating-out Proctor & Gamble laundry detergent containers, etc. Separation can additionally or alternatively be keyed based on other metadata parameters—not just brand. For example, Coke bottles manufactured in France may be separated in one pass, and Coke bottles manufactured in Germany may be separated in another pass.

Figure 28:
FIG. 28 depicts a crushed bottle.

Applicant has discovered that many containers are crushed prior to sortation in such a manner that causes their generally planar bottom surfaces (i.e., the surfaces on which they normally rest) to be translated so as to be generally co-planar with their crushed sidewall (e.g., the cylindrical sidewall of a water bottle). FIG. 28 illustrates this effect. The bottom portion of this cylindrical water bottle (indicated by the oval) is no longer orthogonal to the side wall, as was the case in the bottle's original configuration, but rather is more nearly parallel.

A consequence of this crushing artifact is that while most of the image pixels captured from a waste item depict its side wall(s), a substantial fraction of the image pixels may also depict its bottom surface. In view of this recurring phenomenon, applicant has found it desirable to watermark not just the sidewall surfaces of plastic containers, but also their bottom surfaces. So doing can increase the area of watermark signal presented by an item to a camera, and thereby increase the reliability of watermark signal reading.

Typically, the side surface is marked with a first digital watermark pattern having a first plural-bit payload, and the bottom surface is marked with a second digital watermark pattern having a second plural-bit payload, where the first and second payloads are identical.

In a particular embodiment, the first digital watermark pattern (formed on the side surface of the container), comprises plural edge-adjoining first watermark signal tiles, and the second digital watermark pattern (formed on the bottom of the container), comprises one or more of the same first watermark signal tiles. In many implementations, no watermark signal tile of the second digital watermark pattern is edge-adjoining with a watermark signal tile of the first digital watermark pattern. However, in other implementations, the first and second digital watermark patterns can include edge-adjoining tiles.

The first digital watermark pattern may be formed by printing on the container substrate or a container label, or it may be formed by texturing of the substrate surface. Likewise with the second digital watermark pattern, although texturing is the usual case.

Thus, a further aspect of the technology is a plastic container having a side surface, and a bottom surface orthogonal to the side surface, where both of said surfaces are marked with a digital watermark pattern. The side surface may be marked by 2D watermark printing (e.g., on a label) or by 3D watermark texturing (i.e., of the plastic substrate), whereas the bottom surface is most commonly marked by 3D watermark texturing.

Forced air blowout (air-jets) was noted as one means for diverting an item from a conveyor belt. A particular air blowout arrangement is detailed patent publication US20190070618 and comprises a linear array of solenoid-activated air-jet nozzles positioned below the very end of a conveyor belt, from which location items on the belt start free-falling under the forces of gravity and their own momentum. Without any air-jet activity, items cascade off and down from the end of the belt, and into a receptacle or onto another belt positioned below. Items acted-on by one or more jets are diverted from this normal trajectory, and are diverted to a more remote receptacle or belt—typically by a jet oriented to have a horizontal component away from the belt, and a vertical component upwards. This and other separation and sorting mechanisms are known to the artisan, e.g., from U.S. Pat. Nos. 5,209,355, 5,485,964, 5,615,778, 20040044436, 20070158245, 20080257793, 20090152173, 20100282646, 20120031818, 20120168354, 20170225199, 20200338753 and 20220106129. Operation of such diverters is controlled to apply an ejection force against a targeted position on a waste item, as detailed earlier.

Air-jet ejection is not required; diversion of items by other means is also contemplated. One technique that is gaining popularity is waste item picking by robotic manipulators. In addition to robotic technologies taught in the patents cited in the preceding paragraph, examples of robotics to remove items from conveyors are shown in patent publications WO21260264, US20210237262 and US20210206586.

In the particular implementations detailed above, distances are usually depicted as edge to edge between image zones, but can be defined otherwise. One such alternative is between zone centers.

In certain of the discussed examples, common watermark payload data was identified in several image zones by applying a watermark decoding process to each zone. However, this is not essential. A single zone can be decoded to extract its watermark payload data. Then the pattern of imagery from this single zone can be correlated against other imagery to identify nearby zones that are likely encoded with the same watermark payload data. (This likelihood is indicated by the correlation between the zones that exceeds an empirically-selected threshold value. Such threshold is selected to limit erroneous determinations to below an application-dependent level.)

While the item center of gravity in FIG. 10 is specified with a single datum (i.e., a distance above the base of the item, on the item center-line), this point can be specified relative to other locations (e.g., templated watermark areas), and may not be on the item center-line (in which case additional data may be specified).

Some metadata databases describe region(s) that are watermarked. Others operate with assumption that the item surface is watermarked except where specified.

It will be understood that in some embodiments, the metadata database of FIG. 10 will not include each of the data shown. Additionally or alternatively, the database may include other data in addition to that shown.

Inspection will reveal that the watermark and spectroscopy image zones in the figures are not to the pixel scale indicated in the specification. This is done to aid clarity of illustration.

Repeated reference was made to placements being "consistent" with the template data. It will be understood that the template data provides ground truth information for the item. Any conclusion derived from the image data must not be in conflict with this template data (i.e., it is preferably consistent).

Consistency requires item material be as expected. For example, data from spectroscopy analysis should not find PP, PET, PE, etc., at a location where the template data indicates a different plastic should be found.

Consistency also requires spatial (geometric) relationships be as expected. Given a known "up" direction, a cap should not be found in a "down" direction relative to a label. If a cap is found in such a relationship to a label, they are inconsistent, and can be concluded to be associated with different items—not the same item.

In some embodiments, spectroscopy image zones can be as small as a single pixel. That is, the reflected spectrum is characterized to produce a reflectance (or absorbance) curve indicating the intensity of reflected light at wavelengths through the NIR spectrum, for each pixel imaged by the spectroscopy camera system.

While reference has been made to first and second data that are provided, respectively, using watermark decoding and spectroscopy (or NIR), it should be repeated that both data can be provided otherwise, e.g., using others of the technologies identified above.

Although measurements recited above are commonly in inches or centimeters, measurements can be specified otherwise, such as in terms of image pixels. The mapping between pixels and inches, on the belt, is commonly known (e.g., 150 pixels per inch). Surfaces above the belt may have a slightly different mapping (e.g., 142 pixels per inch), but this is usually inconsequential. If important, the height of the item surface above the conveyor belt can be sensed (e.g., by a 3D camera), and appropriate adjustments can be made.

It is sometimes stated that the metadata "indicates" certain information-such as a distance between two areas. This does not require that the indicated information be expressed, per se. Rather, what is required is that the indicated information be determinable from the information that is conveyed in the metadata.

It will be understood that the template data referenced above generally serves to define physical attributes of an item, and the item's different components/areas. This is in contrast to other data, such as provenance data, which can indicate the company that distributes the item, where the item was manufactured, the date a mold was made, etc.

The specification sometimes refers in shorthand fashion to watermark data, watermark zones, and the like, without further elaboration. It will be understood that such data, and such zones, are characterized by a 2D pattern (which is commonly textured in the item surface, but may be printed) that includes a reference signal component and a payload signal component. These signals are further defined in patent documents referenced herein, such as U.S. Pat. Nos. 6,590,996, 9,959,587 and 10,242,434.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this patent application, a watermark (sometimes termed a digital watermark) is a 2D machine-readable code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments, the ratio N/K is 0.1 or less. Due to the small base rate, a payload can be decoded from a watermark even if half of more (commonly three-quarters or more) or the code is missing.

In an illustrative watermarking arrangement, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding 1024 bits. These bits are then scrambled and spread to yield the 16,384 values in a 128×128 watermark signal pattern.

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again, in contrast, synchronization in QR codes is achieved by alignment patterns placed at three corners and at certain intermediate cells. Message data is expressed at none of these locations.

It bears repeating that this specification builds on work detailed in the earlier-cited patent filings, such as U.S. publications 20220055071, 20210299706 and 20220331841. This application should be read as if the disclosures of the cited documents are bodily included here. (Their omission shortens the above text and the drawings considerably, in compliance with guidance that patent applications be concise, to better focus on the inventive subject matter.) Applicant intends, and hereby expressly teaches, that the improvements detailed herein are to be applied in the context of the methods and arrangements detailed in the cited documents, and that such combinations form part of the teachings of the present disclosure.

While the focus of this disclosure has been on plastic containers, the technology is more broadly applicable. The detailed arrangements can be applied to items having components of metal, glass, paper, cardboard and other fibrous materials, etc. Similarly, while reference has often been made to bottles, it will be recognized that the technology can be used in conjunction with any items, e.g., trays, tubs, pouches, cups, transport and other containers, flexibles, films, etc.

Moreover, while the emphasis of the specification has been on recycling, it should be appreciated that the same technology can be used to sort items for other purposes (e.g., sorting packages on a conveyor in a warehouse or shipping facility).

Reference has been made to recycling. Recycling is typically a two-phase process. A material recovery facility (MRF) processes incoming material and performs an initial separation. Segregated fractions are then transported to other facilities, which are specialized in recycling different components. Glass goes to a glass recycler, paper to a paper recycler, etc. A MRF may, but does not always, divide plastics into several fractions, e.g., PET, PP, PVC, PE, HDPE, etc. Each fraction can be routed to a recycling facility specialized to one or several particular types of plastic. At the recycling facility, a further separation can take place. For instance, PET plastic may be sorted into food/non-food, clear/colored, virgin/previously-recycled, mono-layer/multi-layer, items with metallization layers/items without metallization layers, etc. The technologies detailed above can be employed at both MRFs and recycling facilities.

It will similarly be understood, by way of illustration, that NIR may be used at a material recovery facility to compile a bin of PET plastics. This bin can then be transported to a recycling facility, where watermarking (or AI, or a combination of technologies) is employed to sort the PET plastics into finer categories. These finer categories can include, e.g., any or all of: food/non-food, virgin plastic/recycled plastic, bioplastic/petroleum-based plastic, monolayer/multi-layer, items with/without metallization layers, items with/without specified additives (e.g., fluorescing tracers, oxygen scavengers, etc.), Coke bottles/non-Coke bottles, capped bottles/uncapped bottles, clean containers/dirty containers, etc., etc.

Although the specification emphasizes watermarks, NIR spectroscopy, and AI as techniques for determining information about objects for purposes of sorting, there are a great variety of other item identification methods that can be incorporated in a recycling sorting system and used in conjunction with other technologies as described herein. Some are detailed in Zou, Object Detection in 20 Years: A Survey, arXiv:1905.05055v2, May 16, 2019, which forms part of U.S. patent application 63/175,950 and is incorporated by reference. The present application should be understood as teachings combinations of the technologies detailed by Zou with the features and approaches detailed herein.

Another alternative item identification technology involves incorporating tracer compounds in the plastic, or in ink printed on containers or their labels. Exemplary are tracers marketed by Polysecure GmbH which, when stimulated with 980 nm illumination, respond by fluorescing at green, red and far-red. Such tracers may be based on ytterbium ($Yb^{3+}$)-doped oxide crystals, either combined with erbium $Er^{3+}$, holmium $Ho^{3+}$ or thulium $Tm^{3+}$ activator ions. With three binary tracers, seven states can be signaled. The tracers can be added in different proportions (e.g., 25%, 25%, 50%), enabling further states to be signaled. See, e.g., Woidasky, et al, Inorganic fluorescent marker materials for identification of post-consumer plastic packaging, Resources, Conservation and Recycling, 2020 Oct. 1; 161:104976.

Still another plastic identification technology employs long persistence phosphors, which respond to UV, violet or blue light with responses elsewhere in the spectrum. The dim emission of long persistence phosphors can be mitigated by triggering the phosphors to release their stored energy all at once (rather than over more typical intervals of seconds to hours). This is done by further stimulating the once-stimulated phosphors, this time with NIR, leading to a burst of stored energy. Items marked in this manner can be illuminated with the halogen or other NIR illumination systems conventionally used in materials recovery facilities. Existing NIR spectroscopy systems can similarly be adapted to recognize the different visible/NIR phosphor responses produced by such phosphors. As with other tracers, such phosphors can be used in combinations (and/or fractions) that enable many different states to be signaled, e.g., this is a food grade item, of multi-layer construction, incorporating a PET layer. See, e.g., patent publication WO18193261.

Yet another identification technology is based on X-ray fluorescence (XRF). This involves bombarding a doped plastic material with x-rays, causing certain of the electrons in the dopant to leave their atoms (ionization), and causing other electrons from outer orbital areas to fall into the voids left by the ionized electrons. In falling, photons are released (fluorescence), and the energy of the photons (i.e., the energy difference between the two orbits involved) serves to identify the molecule. Such fluorescences can be sensed by conventional IR/NIR spectroscopy. Chemical elements with which plastics can be doped to give this effect include one or more of Na, K, Ba, Ca, Mg, Ni, Al, Cr, Co, Cu, Hf, Fe, Pb, Sn, Zn, Ti, Zr, Y, Se, Nb, Sr, Mn, Mo, V and Bi. See, e.g., patent publications WO2021070182 and US20210001377.

Still another plastic identification technology involves illuminating a waste flow with middle infrared radiation, to which plastics respond with distinctive spectra (as with near infrared), but also includes responses from black plastics. However, the middle infrared responses of plastics cannot be sensed with conventional silicon-based image sensors. This problem can be mitigated by adding energy from a Neodymium-doped yttrium-vanadat laser in a non-linear medium. The two signals sum in the non-linear medium, resulting in a signal detectable in the NIR band, from which the MIR response can then be determined. See, e.g., Becker, et al, Detection of black plastics in the middle infrared spectrum (MIR) using photon up-conversion technique for polymer recycling purposes, Polymers, 2017 September; 9(9): 435.

The just-detailed technologies can be used to determine item identification information in the earlier-described arrangements, and can similarly be used to access stored metadata corresponding to items.

Some materials recovery facilities employ two-pass sorting. Initially-identified items are ejected from the material flow. The un-identified items flow onto a second, often-narrower belt. During the transfer the items are jostled, and their presentations are changed. This reveals surfaces that may not have been camera-visible previously, and may separate items that previously overlaid each other. The second belt conveys the items past a second camera system that may employ a single camera, rather than the multiple cameras that spanned the first belt.

Although 2D and 3D image sensors can be used in illustrative embodiments (e.g., the IMX425 and IMX661 by Sony, and the RealSense 3D sensors developed by Intel), they are not required. Image sensing can instead be performed by linear array sensors that capture line scan images at a suitably-high rate. Some line scan cameras operate at rates above 10,000 lines per second. For example, the Cognex CAM-CIC-4KL-24 camera captures lines of 4000 pixels at a rate of 24,000 lines per second. Line scan cameras do not suffer barrel distortion that is present in area scan cameras, permitting the camera to be closer to the belt. (Positioning further from the belt helps mitigate barrel distortion in area scan cameras.) By positioning the camera closer to the belt, less intense illumination may be used. Still further, the 4000 pixel resolution of such cameras enables imaging of the full width of a conveyor belt using fewer cameras. (In contrast, typical area scan cameras have a resolution of 1280 pixels across the belt.) Such factors can contribute to a lower cost for line scan-based implementations.

Relatedly, while global shutter cameras are normally used, rolling shutter cameras can be used in alternative embodiments.

Increasingly, image sensors are including convolutional neural network (CNN) hardware in the same package—and often on the same semiconductor substrate—as the image sensor. The Sony IMX500 is such a sensor. Such CNN hardware can be used in embodiments employing neural network analysis of imagery.

This specification frequently references "waste" items. This is meant to refer simply to a material flow of used items. Some may be recycled; others may be re-used.

Reference was made to use of image keypoints. The artisan is familiar with such term, which includes techniques like SIFT keypoints (c.f. U.S. Pat. No. 6,711,293), ORB keypoints (c.f., Rublee, et al, "ORB: an efficient alternative to SIFT or SURF," 2011 IEEE Int'l Conference on Computer Vision (ICCV)) and FAST keypoints (c.f. Rosten, et al, Fusing points and lines for high performance tracking, 10th IEEE Int'l Conf. on Computer Vision, 2005, pp. 1508-1515, and Rosten, et al, Machine learning for high-speed corner detection, 2007 European Conference on Computer Vision, pp. 430-43; these latter two papers are attached to U.S. patent application 62/548,887, filed Aug. 22, 2017).

It will be recognized that systems employing aspects of the present technology do not require a conveyor belt per se. For examples, articles can be transported past the camera system and to diverter systems otherwise, such as by rollers or by free-fall. All such alternatives are intended to be included by the terms "conveyor belt," "conveyor" or "belt."

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor-such as discerning affine pose parameters from a watermark reference signal in captured imagery, or decoding watermark payload data-involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to discern affine pose parameters from a watermark reference signal, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC, e.g., for discerning affine pose parameters from a watermark reference signal in captured imagery, or decoding watermark payload data, again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems-special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices.

Other recycling arrangements are taught in U.S. Pat. Nos. 4,644,151, 5,965,858, 6,390,368, 20060070928, 20140305851, 20140365381, 20170225199, 20180056336, 20180065155, 20180349864, and 20190030571. Alternate embodiments of the present technology employ features and arrangements from these cited documents.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A method that includes:

determining identification information for a waste item on a conveyor, by processing image data that depicts said item on said conveyor;

using said identification information to obtain metadata about said item, the metadata indicating that the item originally comprised a body portion of a first plastic, and a second portion of a second, different plastic, wherein the metadata further includes template data specifying expected spatial locations of plural regions of the item; and diverting the item from the conveyor to a destination;

wherein the method further includes, using one or more processors:

detecting an area of the second, different plastic on the conveyor;

determining a frame of reference for the item as depicted in the image data;

using said determined frame of reference, evaluating whether said detected area of the second, different plastic comprises part of said item;

identifying a constellation of plural image zones corresponding to portions of the item;

determining one or more possible placements of the constellation of plural image zones that are consistent with the template data; and establishing an ejection target for said diverting based on the determined one or more possible placements, in accordance with an outcome of said evaluating; and actuating said diverter mechanism in accordance with the established ejection target to effect said diverting.

2. The method of claim 1 in which said evaluating concludes that the detected area of the second, different plastic comprises part of said item, and the method includes establishing the ejection target to eject the item, taking into account said detected area of the second, different plastic.

3. The method of claim 1 in which said evaluating concludes that the detected area of the second, different plastic does not comprise part of said item, and the method includes establishing the ejection target to eject the item, not taking into account said detected area of the second, different plastic.

4. The method of claim 1 in which said metadata includes location data indicating an original location of said second portion on said item, and the method includes using said location data in evaluating whether said detected area of second, different plastic comprises part of said item.

5. The method of claim 1 in which the metadata includes template data indicating locations of one or more regions of the item that were originally marked or unmarked with digital watermark payload data corresponding to said item, the method including:

decoding said digital watermark payload data from one or more image zones within said image data, said one or more zones defining the constellation of plural image zones;

identifying one or more possible placements of said constellation of plural image zones that is consistent with said template data; and establishing said ejection target in accordance with said one or more possible placements.

6. The method of claim 5 in which the template data indicates said locations of the one or more regions relative to a feature of the item discernible from the image data and said determined frame of reference, such as a bottom of the item.

7. The method of claim 1 in which the template data indicates data locating a desired ejection target relative to a feature of the item discernible from the image data and said determined frame of reference, such as a bottom of the item.

8. The method of claim 7 in which the metadata includes template data indicating location of said second portion of the second, different plastic relative to said body portion of the first plastic, the method including:

identifying plastic type for each of plural zones in the image data, including identifying one or more of said plural zones as being the second, different plastic, said one or more zones defining the constellation of plural image zones;

identifying one or more possible placements of said constellation of plural image zones that is consistent with said template data; and establishing said ejection target in accordance with said one or more possible placements, wherein the one or more possible placements are determined for consistency with both the template data and a relative location of the second portion to the body portion.

9. The method of claim 8 in which the template data indicates location of a third portion of said item, of a plastic different than the first plastic, the template data indicating that the second portion and the third portion are not adjoining and are spaced apart, wherein:

a further one of said plural zones is identified as of said plastic different than the first plastic, the constellation of plural image zones including said further zone;

and the method includes identifying one or more possible placements of said constellation of image zones, including said further zone, that is consistent with said template data.

10. The method of claim 1, wherein said determining one or more possible placements of the constellation of plural image zones comprises determining a plurality of possible placements including extrema placements that are consistent with the template data, and wherein establishing the ejection target comprises defining a bounded region from said extrema placements and selecting a location within the bounded region as the ejection target.

11. An apparatus comprising:

a camera system configured to capture image data of a conveyor;

a diverter mechanism configured to divert waste items on the conveyor;

one or more processors configured for:

determining identification information for a waste item on the conveyor, by processing image data captured by said camera system that depicts the item on the conveyor;

obtaining metadata associated with the item by using the identification information, the metadata indicating that the item originally comprised a first portion comprising a first plastic, and a second portion comprising a second, different plastic, wherein the metadata further includes template data specifying expected spatial locations of plural regions of the item; and generating a diverting signal to control said diverter mechanism to divert the item from the conveyor to a destination;

detecting an area of the second, different plastic on the conveyor;

determining a frame of reference for the item as depicted in the image data;

evaluating whether said detected area of the second, different plastic comprises part of said item, in which said evaluating utilizes the determined frame of reference;

identifying a constellation of plural image zones corresponding to portions of the item;

determining one or more possible placements of the constellation of plural image zones that are consistent with the template data; and establishing an ejection target based on the determined possible placements in accordance with an outcome of said evaluating, and actuating said diverter mechanism in accordance with the established ejection target.

12. The apparatus of claim 11 in which said evaluating concludes that the detected area of the second, different plastic comprises part of the item, and said establishing the ejection target utilizes the detected area of the second, different plastic.

13. The apparatus of claim 11 in which said evaluating concludes that the detected area of the second, different plastic does not comprise part of said item, and said establishing the ejection target does not utilize the detected area of the second, different plastic.

14. The apparatus of claim 11 in which the metadata includes location data indicating an original location of the second portion, and in which said evaluating utilizes said location data in evaluating whether the detected area of second, different plastic comprises part of the item.

15. The apparatus of claim 11 in which the metadata includes template data indicating locations of one or more regions of the item that were originally marked or unmarked with digital watermark payload data corresponding to the item, the apparatus further comprising:

a digital watermark decoder for decoding the digital watermark payload data from one or more image zones within said image data, said one or more zones defining the constellation of plural image zones; and, in which said one or more processors are configured for:

identifying one or more possible placements of the constellation that is consistent with the template data;

in which said establishing the ejection target utilizes the one or more possible placements.

16. The apparatus of claim 15 in which the template data indicates said locations of the one or more regions relative to a feature of the item discernible from the image data and the determined frame of reference, such as a bottom of the item.

17. The apparatus of claim 16 in which the template data indicates data locating a desired ejection target relative to a feature of the item discernible from the image data and the determined frame of reference, such as a bottom of the item.

18. The apparatus of claim 11 in which the metadata includes template data indicating location of said second portion of the second, different plastic relative to the first portion of the first plastic, in which said one or more processors are configured for:

identifying plastic type for each of plural zones in the image data, including identifying one or more of said plural zones as being the second, different plastic, the one or more zones defining the constellation of plural image zones; and identifying one or more possible placements of said constellation of image zones that is consistent with said template data;

in which said establishing the ejection target utilizes the one or more possible placements, and in which the one or more possible placements are determined for consistency with both the template data and a relative location of the second portion to the first portion.

19. The apparatus of claim 18 in which the template data indicates location of a third portion of the item, of a plastic different than the first plastic, the template data indicating that the second portion and the third portion are not adjoining and are spaced apart, wherein:

a further one of said plural zones is identified as of said plastic different than the first plastic, the constellation of plural image zones including said further one of said plural zones;

and said one or more processors are configured for: identifying one or more possible placements of the constellation of image zones, including said further one of said plural zones, that is consistent with the template data.

20. The apparatus of claim 11, wherein said determining one or more possible placements of the constellation of plural image zones comprises determining a plurality of possible placements including extrema placements that are consistent with the template data, and wherein establishing the ejection target comprises defining a bounded region from said extrema placements and selecting a location within the bounded region as the ejection target.

* * * * *